United States Patent
Dalmia et al.

(10) Patent No.: US 12,266,846 B2
(45) Date of Patent: Apr. 1, 2025

(54) SYSTEM PACKAGING FOR MILLIMETER WAVE ANTENNAS

(71) Applicant: Apple Inc., Cupertino, CA (US)

(72) Inventors: Sidharth S. Dalmia, San Jose, CA (US); Wansuk Yun, Sunnyvale, CA (US); Flynn P. Carson, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 560 days.

(21) Appl. No.: 17/465,761

(22) Filed: Sep. 2, 2021

(65) Prior Publication Data

US 2023/0066814 A1    Mar. 2, 2023

(51) Int. Cl.
| | |
|---|---|
| H01Q 1/22 | (2006.01) |
| H01Q 1/24 | (2006.01) |
| H01Q 1/38 | (2006.01) |
| H01Q 21/00 | (2006.01) |
| H04B 1/00 | (2006.01) |
| H04W 52/02 | (2009.01) |

(52) U.S. Cl.
CPC ........... *H01Q 1/2283* (2013.01); *H01Q 1/246* (2013.01); *H01Q 1/38* (2013.01); *H01Q 21/0025* (2013.01); *H01Q 21/0087* (2013.01); *H04B 1/0064* (2013.01); *H04W 52/0206* (2013.01)

(58) Field of Classification Search
CPC ........ H01Q 1/2283; H01Q 1/246; H01Q 1/38; H01Q 21/0025; H01Q 21/0087; H04B 1/0064; H04W 52/0206
USPC ...................................... 455/552.1
See application file for complete search history.

(56) References Cited

U.S. PATENT DOCUMENTS

| | | | | |
|---|---|---|---|---|
| 10,653,046 | B2* | 5/2020 | Hong | H01Q 1/243 |
| 10,775,490 | B2* | 9/2020 | Baheti | G01S 7/04 |
| 11,831,585 | B2* | 11/2023 | Dalmia | H04L 41/0896 |
| 2015/0070228 | A1* | 3/2015 | Gu | H01Q 25/00 |
| | | | | 343/727 |

(Continued)

FOREIGN PATENT DOCUMENTS

| | | |
|---|---|---|
| EP | 3745457 A1 | 12/2020 |
| KR | 10-2020-0024408 A | 3/2020 |

(Continued)

OTHER PUBLICATIONS

Taiwanese Office Action for Taiwanese Patent Application No. 111133032 dated Mar. 31, 2023; 8 pgs.

(Continued)

*Primary Examiner* — April G Gonzales
(74) *Attorney, Agent, or Firm* — Fletcher Yoder, P.C.

(57) ABSTRACT

A radio frequency package includes a first portion of an antenna array module, a second portion of the antenna array module, and a flexible cable. The first portion of the antenna array module provides a first wireless communication functionality and the second portion of the antenna array module provides a second wireless communication functionality. The flexible cable includes first surface directly coupled to the first portion of the antenna array module. The flexible cable also includes a second surface directly coupled to the second portion of the antenna array module. The flexible cable communicates signals between the first portion of the distributed antenna array module and the second portion of the antenna array module.

20 Claims, 17 Drawing Sheets

(56) References Cited

U.S. PATENT DOCUMENTS

| | | |
|---|---|---|
| 2018/0315715 A1 | 11/2018 | Chiu et al. |
| 2020/0001409 A1 | 1/2020 | Jung et al. |
| 2020/0036083 A1* | 1/2020 | Kim ........................ H01Q 1/243 |
| 2020/0052393 A1* | 2/2020 | Fang ..................... H01Q 9/0414 |
| 2020/0212545 A1* | 7/2020 | We ........................... H01Q 9/12 |
| 2020/0412021 A1* | 12/2020 | Chang .................... H01Q 5/371 |
| 2021/0143527 A1* | 5/2021 | Cho ........................ H01Q 1/243 |
| 2021/0320414 A1 | 10/2021 | Kim et al. |

FOREIGN PATENT DOCUMENTS

| | | |
|---|---|---|
| KR | 10-2221818 B1 | 3/2021 |
| KR | 10-2221919 B1 | 3/2021 |
| TW | 201839950 A | 11/2018 |
| TW | M581773 U | 8/2019 |
| TW | 202006920 A | 2/2020 |
| TW | 202044504 A | 12/2020 |
| TW | 202117988 A | 5/2021 |
| WO | 2021006578 A1 | 1/2021 |

OTHER PUBLICATIONS

Tech Insights, "Qualcomm QTM052 RF mmWave Antenna Module Analysis Product Brief: 'World's first-announced, fully-integrated mmWave RF solution,'" May 31, 2019, published at https://www.techinsights.com/blog/qualcomm-qtm052-mmwave-antenna-module, pp. 1-18.

International Search Report and Written Opinion for PCT Application No. PCT/US2022/035676 dated Nov. 1, 2022; 12 pgs.

Office Action for Taiwanese Patent Application No. 111133032 dated Nov. 15, 2024; 16 pgs.

* cited by examiner

SYSTEM PACKAGING FOR MILLIMETER WAVE ANTENNAS

BACKGROUND

The present disclosure relates generally to wireless communication systems and devices and, more specifically, to system packaging that accommodates wireless communication components while conserving space.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, radio frequency devices may include a package, such as a system in package (SiP). A system-in-package incorporates substrates, dies, multiple integrated circuits, and/or passive devices into a single package. The system-in-package may be made of semiconducting material, such as silicon. For example, the substrates and dies may include silicon on which the integrated circuits are fabricated. The substrates, dies, and devices may be coupled by wires bonded to the package or by solder joints (e.g., solder balls or pads). By way of example, the dies may be stacked (e.g., two-and-a-half-dimensional (2.5D) or three-dimensional (3D) stack structure) to combine the dies into the same package rather than placing them on a printed circuit board. In some instances, the system-in-package may also include multiple packages that are stacked (e.g., using a package on package (PoP) technique) or have dies embedded in substrate.

By way of example, radio frequency devices that support communication over millimeter wave (mmWave) range frequencies often provide support at frequencies at or near 30 GHz. In some instances, radio frequency devices may also support the mmWave communication over additional mmWave bands for broader frequency coverage, such as for 30-300 GHz. Multiple antennas (e.g., an antenna array) of the radio frequency devices may send signals that are combined to form a beam (e.g., a beamformed signal) for communicating over the mmWave. To enable consistent coverage (e.g., from base stations associated with the mmWave communications), the radio frequency devices may include multiple antenna arrays positioned in different parts of the radio frequency devices. However, fitting these multiple antenna arrays in the system-in-package of the radio frequency devices may take up space and undesirably increase the size of the radio frequency devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a radio frequency package includes a first distributed portion (e.g., a first portion) of an antenna array module, a second distributed portion (e.g., a second portion) of the antenna array module, and a flexible cable. The first distributed portion of the antenna array module provides a first wireless communication functionality and the second distributed portion of the antenna array module provides a second wireless communication functionality. The flexible cable includes first surface directly coupled to the first distributed portion of the antenna array module. The flexible cable also includes a second surface directly coupled to the second distributed portion of the antenna array module. The flexible cable communicates signals between the first distributed portion of the distributed antenna array module and the second distributed portion of the antenna array module. The energy between array module on either side of cable maybe communicated via a physical electrical connection or by means of electromagnetic coupling or combination of both. The purpose of this embodiment is to eliminate the need for bulky connectors at mmWave and high frequencies. The cables also bring in control, RF and intermediate frequencies as well as power from the main board to a remote mmWave antenna array.

In another embodiment, a system package includes a first distributed portion of an antenna array module, a second distributed portion of the antenna array module, and multiple solder balls. The first distributed portion of the antenna array module provides a first wireless communication function and the second distributed portion of the antenna array module provides a second wireless communication function. The first distributed portion, second distributed portion, or both, include one or more cavities that provide a direct communication path between components in the one or more cavities and the first distributed portion, second distributed portion, or both. The multiple solder balls couples the first distributed portion of the antenna array module and the second distributed portion of the antenna array module.

In yet another embodiment, a system-in-package includes a first distributed portion of an antenna array module, a second distributed portion of the antenna array module, a transceiver, and a power management circuitry. The first distributed portion of the antenna array module provides a first wireless communication functionality, in which the first distributed portion includes a first set of metal layers. The second distributed portion of the antenna array module provides a second wireless communication functionality, in which the second distributed portion includes a second set of metal layers, and in which the first distributed portion of the antenna array module directly couples to the second distributed portion of the antenna array module via an adhesive. The transceiver transmits transmission signals, receives reception signals, or a both, via one or more antennas of the antenna array module, in which the transceiver communicatively couples to the antenna array module. The power management circuitry controls power functions related to the transmission signals and the reception signals, in which the power management circuitry communicatively couples to the antenna array module.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
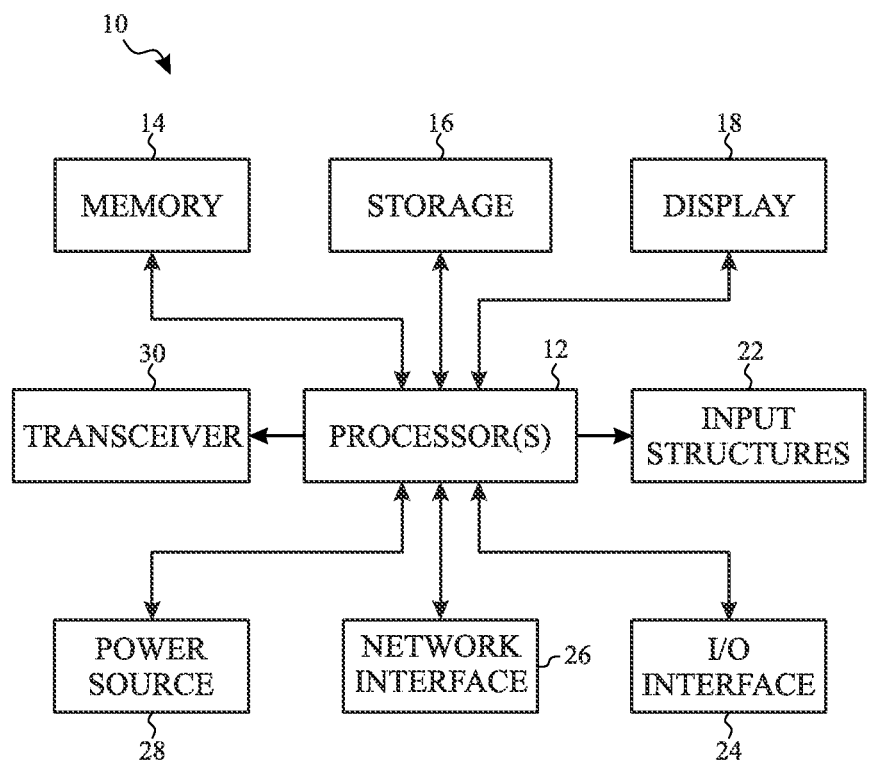
FIG. 1 is a block diagram of an electronic device, according to an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

As used herein, "panel" refers to a printed circuit board that includes one or more packages (e.g., system-in-packages that include substrates, dies, modules, and/or components) that may correspond to a particular side or portion of a radio frequency device. By way of example, a back glass panel may refer to the printed circuit board with the one or more packages for the back surface of the radio frequency device. Additionally, as used herein, "distributed" refers to physically reducing or fragmentizing into parts or portions (e.g., two or more). By way of example, a single antenna array module may include multiple layers that may be distributed, such that different parts or portions of the module may be disposed in various areas within a silicon package. By way of example, the single antenna array module may include sixteen layers and may be disposed on top of a main logic board within the package. The antenna array module may be distributed, such that a first portion of the antenna array module may include ten layers that are disposed on top of the main logic board while a second portion of the antenna array module may include six layers that are disposed on the bottom (e.g., underneath) of the main logic board. That is, instead of the antenna array module disposed on top of or below the main logic board as a single piece, smaller portions of the antenna array module are distributed about the main logic board. By distributing the antenna array module into the multiple portions, the dimensions associated with the single antenna array module may be distributed into smaller dimensions, which may be more efficiently placed between various portions and/or components of the package. In particular, the distribution may enable placement of other components in the package (e.g., around the main logic board) that may not fit if the antenna array module is placed about the main logic board as a single piece. The number of portions and/or the dimensions of the portions of the antenna array module may be based on the dimensions of other components and/or locations of the other components (e.g., co-locations) to be placed within the package. In some instances, the antenna array module may be distributed based on a functionality provided by the portions or components included in the portions. For example, the first portion may include antenna functionality circuitry while the second portion includes antennas and/or radio frequency routing circuitry for the antennas near 30 GHz. However, the radio frequency devices may also support communication over additional mmWave bands for broader frequency coverage, such as for 30-300 GHz. As such, the packaging for the radio frequency devices may include particular components to support the multiple protocols and capabilities. However, the dimensions for the overall packaging design may be limited to original dimensions associated with supporting a single protocol and capability (e.g., communication at the 30 GHz) to continue providing a portable and comfortable design for customer use.

As such, the present disclosure provides techniques for conserving space in a radio frequency packaging (e.g., a system-in-package) for various sides of a radio frequency device. In particular, the techniques may include conserving space in the package of a rear surface, a front surface, a left side, and/or a right side of the radio frequency device, for example, to facilitate adding and/or replacing components within the package to support various protocols and capabilities (e.g., for additional or new wireless communication support). In this manner, the package may conserve space while also enabling addition or replacement of wireless communication protocols and capabilities. Conserving space may result in package dimensions that are smaller, the same, or approximately the same as original dimensions of the package prior to adding components associated with the additional or replaced wireless communication protocol and capabilities. Additionally or alternatively, the present disclosure may also provide techniques for conserving space while generally maintaining a distance between particular components (e.g., spacing), co-location of particular components, or other locations of the components within the package for the particular side of the radio frequency device.

As will be discussed herein, conserving space within the system package for efficient packaging may include distributing one or more antenna array modules into multiple portions that may be placed separately within the package and/or a flexor cable that provides board-to-board functionality (e.g., instead of using a board-to-board connector) to carry signals between printed circuit boards. Conserving space within the system package may also include selectively including mold that accommodates components, the distributed portions of the antenna array module, and/or the flexor cable with the board-to-board connector functionality. Additionally, conserving space within the package may include forming cavities within the antenna array layer, such that antennas may be placed within the cavities for efficient space usage, as well as more direct communication between radio frequency circuitry and the antennas. Furthermore, the package may include underfill and/or shielding, a recess to a portion of the package to accommodate components, as well as direct coupling of components by using an adhesive material between printed circuit boards to provide a direct interface. In some instances, the package may include varying sizes and/or placements of components to create a "T-shaped" structure of the package (e.g., the package being wider at the top and narrower at the bottom).

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a power source 28, and a transceiver 20. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
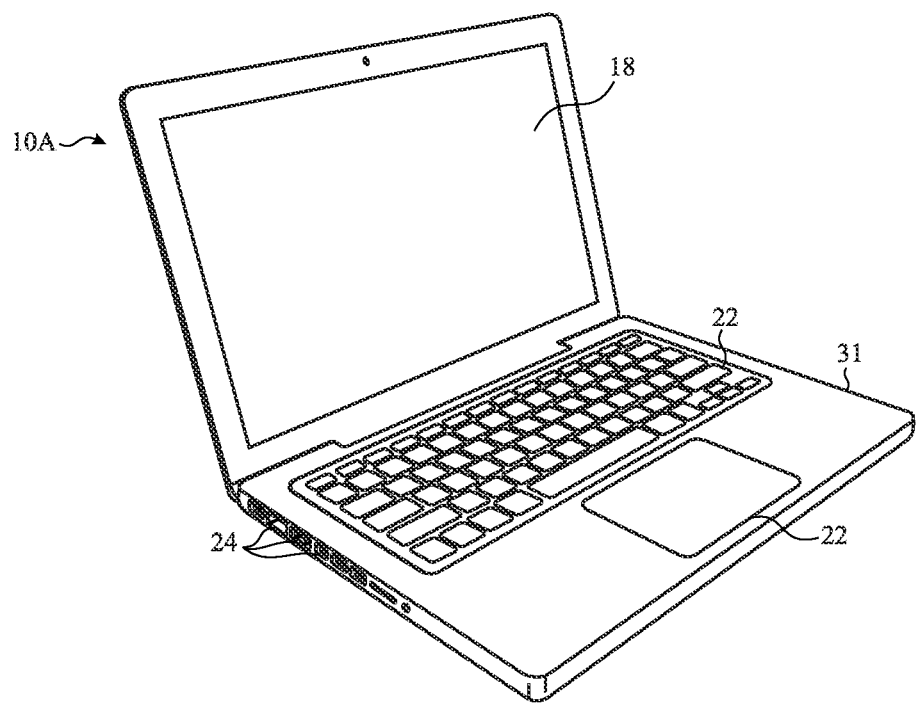
FIG. 2 is a perspective view of a notebook computer representing an embodiment of the electronic device of FIG. 1.
Figure 4:
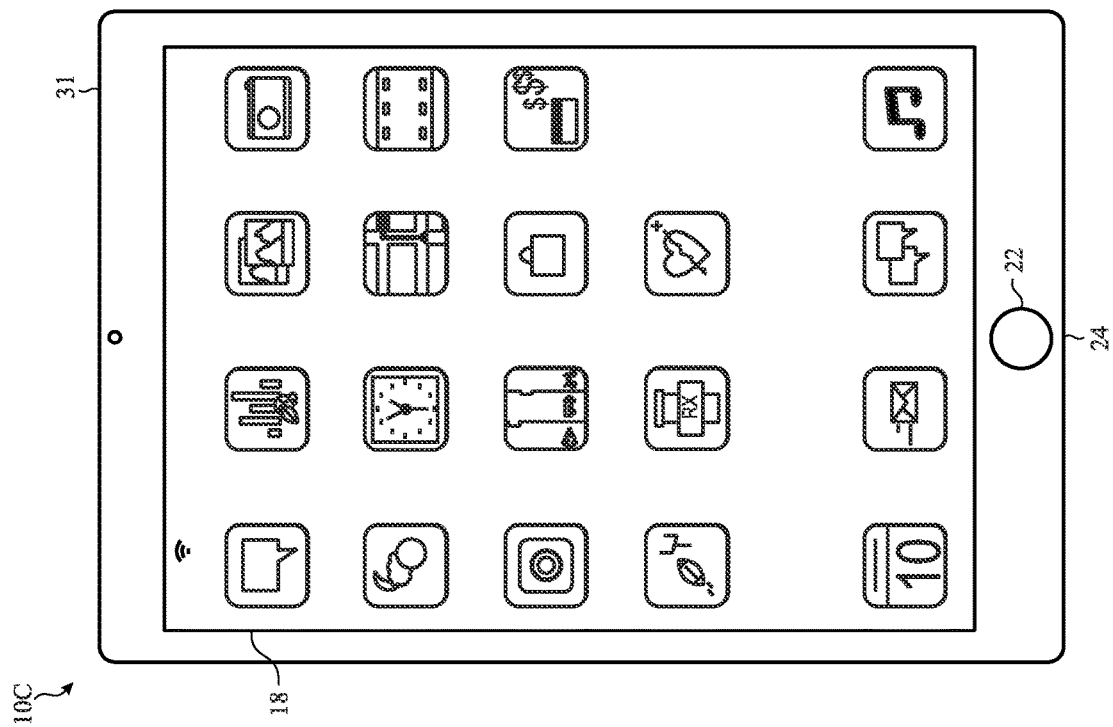
FIG. 4 is a front view of another handheld device representing another embodiment of the electronic device of FIG. 1.
Figure 3:
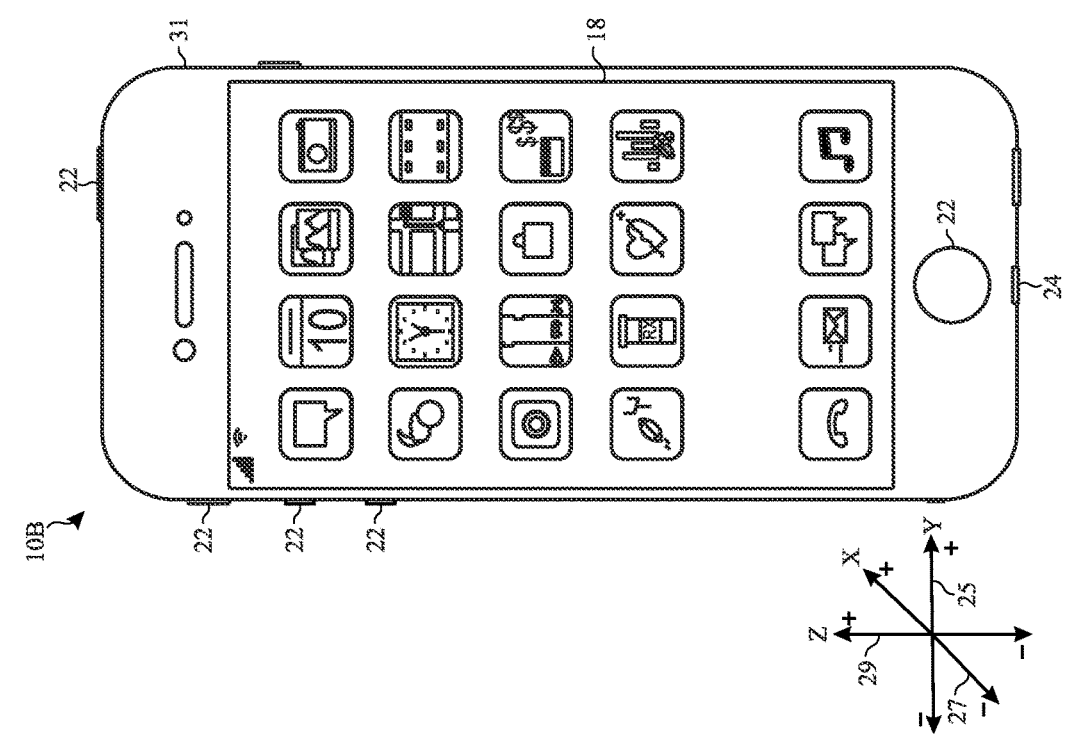
FIG. 3 is a front view of a handheld device representing another embodiment of the electronic device of FIG. 1.
Figure 5:
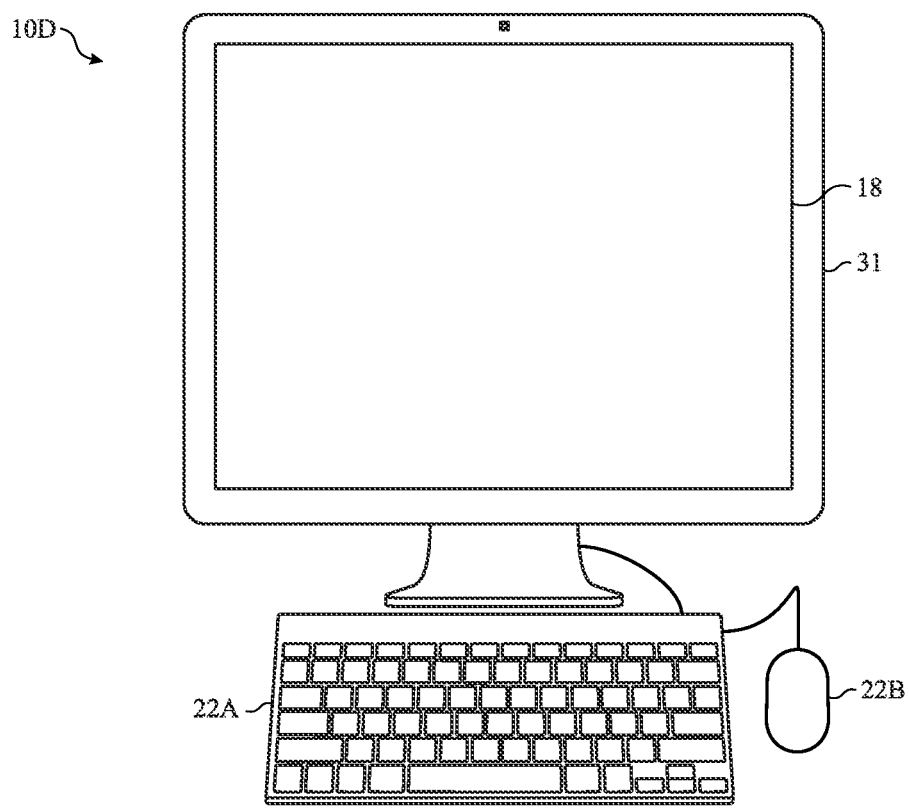
FIG. 5 is a front view of a desktop computer representing another embodiment of the electronic device of FIG. 1.
Figure 6:
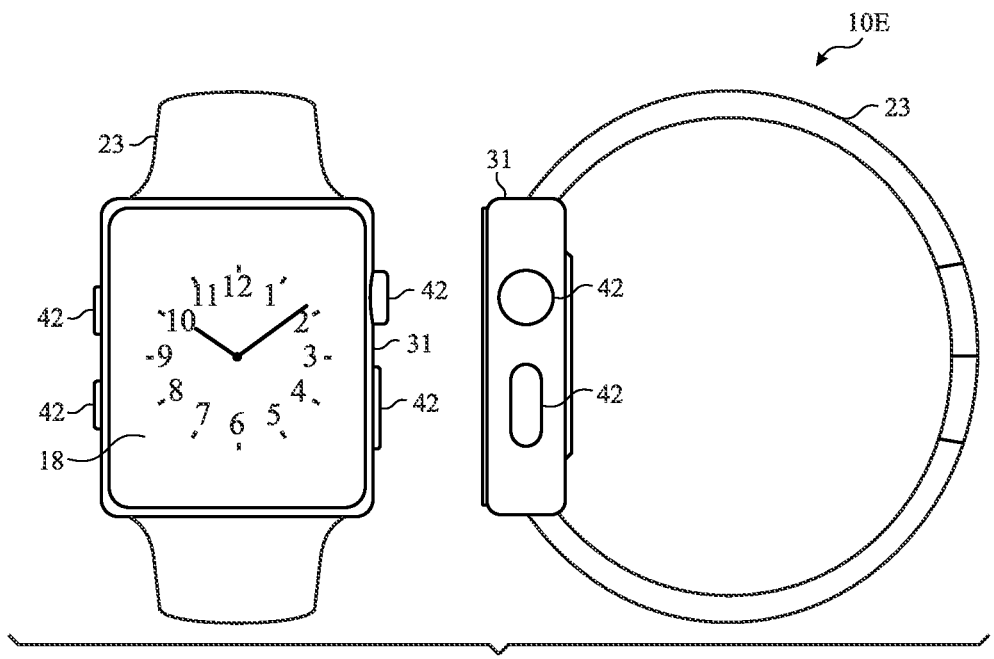
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms. For example, algorithms for adjusting input/output power of antennas may be saved in the memory 14 and/or nonvolatile storage 16. Such algorithms or instructions executed by the processor(s) 12 may be stored in any suitable article of manufacture that includes one or more tangible, computer-readable media. Moreover, antenna gain lookup tables used for determining total transmission gains and/or total reception gains may be saved in the memory 14 and/or nonvolatile storage 16. Specifically, one or more codebooks may be stored in the memory 14 and/or nonvolatile storage 16. The tangible, computer-readable media may include the memory 14 and/or the nonvolatile storage 16, individually or collectively, to store the algorithms or instructions. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network. In particular, the network interface 26 may include, for example, one or more interfaces for using a Release-15 cellular communication standard of the 5G specifications that include the millimeter wave (mmWave) frequency range (e.g., 30-300 GHz). The transceiver 20 of the electronic device 10, which includes the transmitter and the receiver, may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

In some embodiments, the electronic device 10 communicates over the aforementioned wireless networks (e.g., WI-FI®, WIMAX®, mobile WIMAX®, 4G, LTE®, 5G, and so forth) using the transceiver 20. The transceiver 20 may include circuitry useful in both wirelessly receiving the reception signals at the receiver and wirelessly transmitting the transmission signals from the transmitter (e.g., data signals, wireless data signals, wireless carrier signals, radio frequency signals). Indeed, in some embodiments, the transceiver 20 may include the transmitter and the receiver combined into a single unit, or, in other embodiments, the transceiver 20 may include the transmitter separate from the receiver. The transceiver 20 may transmit and receive radio frequency signals to support voice and/or data communication in wireless applications such as, for example, PAN networks (e.g., BLUETOOTH®), WLAN networks (e.g., 802.11x WI-FI®), WAN networks (e.g., 3G, 4G, 5G, NR, and LTE® and LTE-LAA cellular networks), WIMAX® networks, mobile WIMAX® networks, ADSL and VDSL networks, DVB-T® and DVB-H® networks, UWB networks, and so forth. As further illustrated, the electronic device 10 may include the power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif. By way of example, the electronic device 10, taking the form of a notebook computer 10A, is illustrated in FIG. 2 in accordance with one embodiment of the present disclosure. The depicted notebook computer 10A may include a housing or enclosure 31, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) and/or applications running on computer 10A. For example, a keyboard and/or touchpad may allow a user to navigate a user interface and/or an application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, Calif. The handheld device 10B may include an enclosure 31 to protect interior components from physical damage and/or to shield them from electromagnetic interference. The enclosure 31 may surround the display 18. The I/O interfaces 24 may open through the enclosure 31 and may include, for example, an I/O port for a hardwired connection for charging and/or content manipulation using a standard connector and protocol, such as the Lightning connector provided by Apple Inc. of Cupertino, Calif., a universal serial bus (USB), or other similar connector and protocol. The interfaces 24 may be associated with wiring and connectors within the radio frequency packaging of the electronic device 10. The wiring and connectors may result in particular areas within a system package of the electronic device 10 that are available for placing components to facilitate supporting multiple wireless communication protocols and capabilities. By way of example, and as will be discussed in detail FIG. 7, if the electronic device 10B is positioned upward along a positive z-axis 29 and facing a positive y-axis 25, an antenna array of a right side panel of the electronic device 10B may be disposed and radiate signals in the positive x-axis 27. Similarly, an antenna array of a left side panel may be disposed and radiate signals in the negative x-axis 27, an antenna array of a front glass panel (e.g., front surface panel) may be disposed and radiate signals in the positive y-axis 25, and an antenna array of a back glass panel (e.g., rear surface panel) may be disposed and radiate signals in the negative y-axis 25.

The input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a Mac- Book®, or other similar device by Apple Inc. of Cupertino, Calif. It should be noted that the computer 10D may also represent a personal computer (PC) by another manufacturer. A similar enclosure 31 may be provided to protect and enclose internal components of the computer 10D, such as the display 18. In certain embodiments, a user of the computer 10D may interact with the computer 10D using various peripheral input structures 22, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 23, may be an Apple Watch® by Apple Inc. of Cupertino, Calif. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

Figure 7:
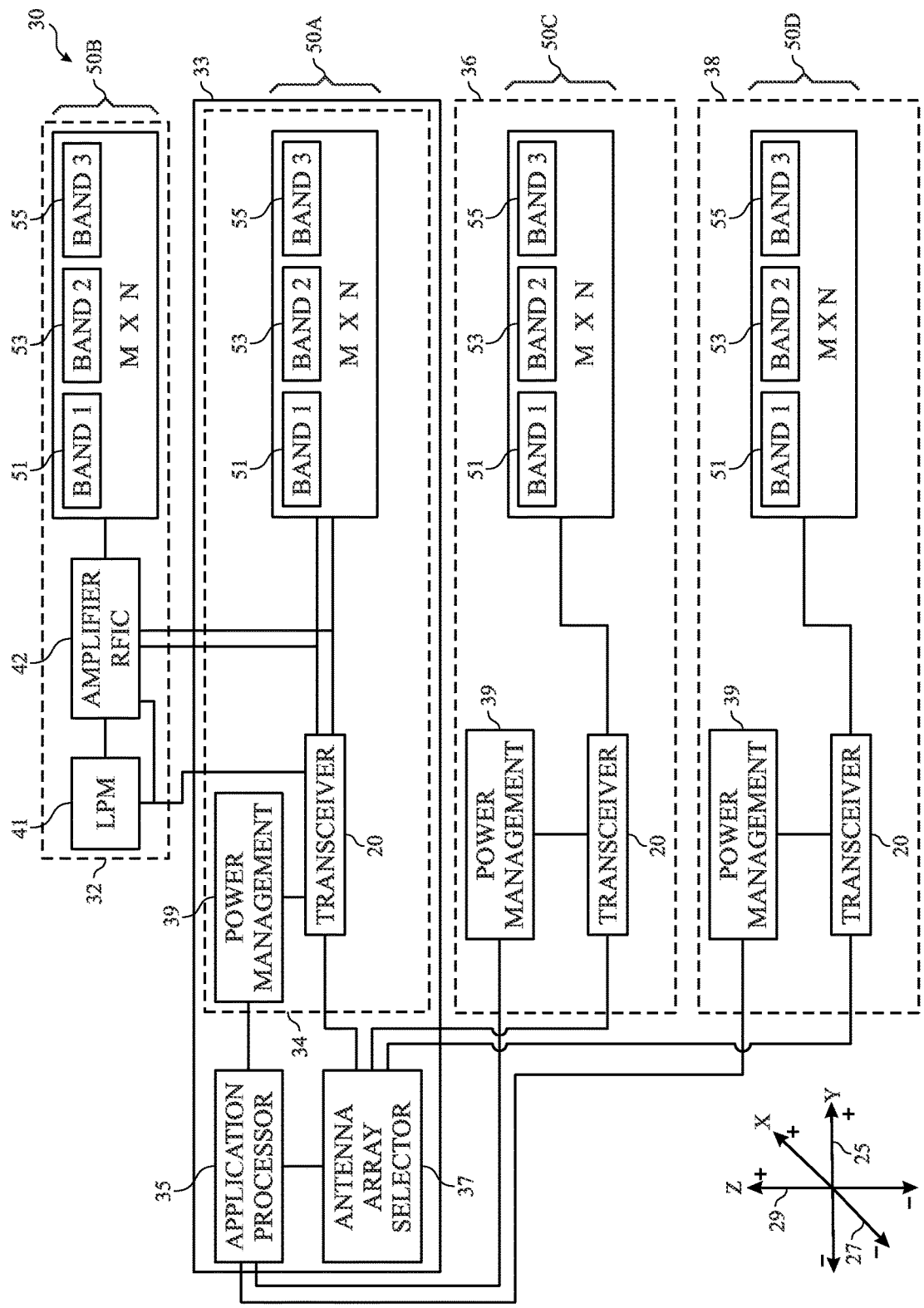
FIG. 7 is a schematic diagram of a system package of the electronic device of FIG. 1, according to embodiments of the present disclosure.

With the foregoing in mind, FIG. 7 is schematic diagram of a system package 30 of the electronic device 10 of FIG. 1. Although the depicted embodiment shows multiple panels on different sides and on the same layer of the electronic device 10, the systems described herein also apply to stacked panels, such as a three-dimensional (3D) stack of printed circuit boards. That is, one or more of the panels may positioned on top of or beneath one or more other panels, for example, in a z-axis 29 in a 3D space. Moreover, at least one of the panels may include a redistribution printed circuit board that provides a connection between the panels that are coupled to it.

In the depicted embodiment, the system package 30 includes packaging for a front glass panel 32 (e.g., front surface panel or cover glass panel), a main logic board 33 with a back glass panel 34, a left side panel 36, and a right side panel 38. Although the following descriptions describe the panels 32, 34, 36, and 38 as disposed respectively on the front, back, left, and right side of the electronic device 10, which represents a particular embodiment, the system package 30 described herein may additionally or alternatively include panel(s) disposed at other areas of the electronic device 10 that may include one or more antennas. For example, the system package 30 may also include top side or bottom side panels disposed respectively at the top or bottom of the electronic device 10, adjacent to the left side panel 36 and the right side panel 38. Moreover, although the following descriptions describe an antenna array, which represents a particular embodiment, the system package 30 described herein may additionally or alternatively include multiple antenna arrays.

The main logic board 33 may include the back glass panel 34, a power management circuitry 39, the transceiver 20, an antenna array selector 37, an application processor 35, and a first antenna array 50A. The application processor 35 may be coupled to the power management circuitry 39 to control power functions, including those related to wireless communications. The power management circuitry 39 may include one or more integrated circuits and control power (e.g., via the processor 12) provided to components of the main logic board 33 and/or the electronic device 10, including, for example, the transceiver 20 and/or the antenna array selector 37. By way of example, the power management circuitry 39 may control supplying power to the main logic board 33 board, providing power to components on or coupled to the main logic board 33, the panels 32, 34, 36, and/or 38, selecting a power source, power sequencing, converting direct current (DC) for specific power related functions, charging a battery of the electronic device 10, and so forth.

As shown, the transceiver 20 may be coupled to the antenna array selector 37, the first antenna array 50A of the back glass panel 34, and components of the front glass panel 32. The antenna array 50A includes multiple antennas that transmit and/or receive wireless signals, and that may form a directional beam using signals emitted by each of the antennas. The transceiver 20, as previously discussed with respect to FIG. 1, is a device that includes a transmitter and a receiver in a single package, and may transmit and receive data via wireless signals communicated on particular radio frequency using the antennas of the first antenna array 50A. Specifically, the transceiver 20 may include a transmitter and a receiver that include components that facilitate transmission and reception of wireless signals, such as those sent and received between electronic devices 10 using mmWave communication technology or any other suitable communication protocol. When communicating on the mmWave frequencies, an electronic device 10 may utilize beamforming techniques to form the directional beam, as previously mentioned. The transmitter of the transceiver 20 may include one or more phase shifters, transmitter power detectors, and power amplifiers. The transmitter phase shifters may modulate (e.g., phase-shift) transmission signals (e.g., wireless signals transmitted from antennas of the first antenna array 50A) and may form a beam that may be steered in a particular direction (e.g., the directional beam), such as towards another electronic device (e.g., an electronic device 10, a base station). The power amplifiers may amplify power level of transmission signals. Specifically, the power amplifiers may be supplied with a power amplifier supply voltage to control the amount of amplification provided by the power amplifiers (e.g., increase or decrease amplification, which may affect the antenna gain at the corresponding antennas). The transmitter power detectors may measure power of the transmission signals sent from the antennas of the first antenna array 50A.

The receiver of the transceiver 20 may include one or more receiver phase shifters, low noise amplifiers, and receiver power detectors. The receiver phase shifters and the receiver power detectors may function similarly to the transmitter phase shifters and the transmitter power detectors. The low noise amplifiers may amplify the power level of reception signals (e.g., wireless signals received at antennas of the first antenna array 50A). Additional components in the transmitter and/or the receiver may include, but are not limited to, filters, mixers, and/or attenuators.

The antenna array selector 37, which may be coupled to the transceiver 20, may activate or enable communication from one or more of the antennas of the antenna arrays 50, such as the first antenna array 50A. For example, based on data throughput, the antenna array selector 37 may selectively enable a number of antennas to accommodate the data throughput. As shown, the antenna array 50A is disposed at the back glass panel 34. The back glass panel 34 may include one or more printed circuit boards that are coupled to a rear surface (e.g., a back glass) of the electronic device 10. As shown, the first antenna array 50A may include an M×N array of first band antennas 51 (Band 1), second band antennas 53 (Band 2), and third band antennas 55 (Band 3). The M×N array may refer to M rows (e.g., one or more rows) and N columns (e.g., one or more columns) of antennas in which the number of rows, column, and/or antennas in the rows and columns may include any number antennas suitable for the particular application (e.g., communications over the mmWave). Additionally, although the following descriptions describe the antenna arrays 50 with a particular number of first band antennas 51, second band antennas 53, and third band antennas 55, which represent particular embodiments, the antenna arrays 50 may include one or more of any of the first band antennas 51, second band antennas 53, and/or third band antennas 55. The first band antennas 51 may enable communication in a first band or range of frequencies, the second band antennas 52 may enable communication in a second band or range of frequencies, and the third band may enable communication in a third band or range of frequencies. In some embodiments, the first band, the second band, and the third band may include different ranges of frequencies. By way of example, the first band may include low-band frequencies, such as 700 MHz to 1.0 GHz, the second band antennas 53 may enable communication in mid-band frequencies, such as 1.8 GHz to 2.2 GHz, and the third band antennas 55 may enable communication in high-band frequencies, such as 20 GHz to 80 GHz.

Additionally, the transceiver 20 may be coupled to a power management module 41 and an amplifier radio frequency integrated circuit (RFIC) 42 of the front glass panel 32. Briefly, and as will be discussed in detail below, the power management module 41 may provide power for the power amplifier of the transceiver 20 to amplify power for the transmission signals. The amplifier RFIC 42 may provide mixing circuitry to demodulate radio frequency signals received by the transceiver 20 and modulate intermediate frequency signals to radio frequency signals for transmitting transmission signals from the transceiver 20.

In some embodiments, the application processor 35 may control the antenna array selector 37 and/or the transceivers 20 (e.g., through the antenna selector 37), and by extension, the antenna arrays 50 of the front glass panel 32, the back glass panel 34, the left side panel 36, and/or the right side panel 38. That is, the antenna array selector 37 may enable one or more of the antennas of the one or more antenna arrays 50 (e.g., antenna arrays 50A-D) to transmit or receive wireless signals via the transceivers 20. In some embodiments, the antenna array selector 37 may enable antennas of the right side panel 38 to transmit signals contributing to a beamformed signal directed to the right with respect to the electronic device 10. By way of example, if the electronic device 10B of FIG. 3 is positioned upward in the positive z-axis 29 and facing the positive y-axis 25, the right side panel 38 may be disposed and radiate signals in the positive x-axis 27. The application processor 35 may also be communicatively coupled to the power management circuitries 29 of each of the front glass panel 32, the main logic board 33, the back glass panel 34, the left side panel 36, and the right side panel 38 to control power related functions with respect to each of the panels.

The application processor 35 may include one or more microprocessors, one or more "general-purpose" microprocessors, one or more special-purpose microprocessors, and/ or one or more application specific integrated circuits (ASICS), or some combination thereof. For example, the application processor 35 may include one or more reduced instruction set (RISC) processors. In some instances, the application processor 35 may perform processing (e.g., execute software programs and/or instructions) for specification functions, such as specific wireless communication related functions. The specific functions may include receiving or generating wireless signals, selecting particular antennas for transmitting or receiving signals using the antenna array selector 37, selecting an amplification level to amplify transmission signals using the power management circuitry 39, determining gain of the wireless signals transmitted and/or received from a particular transmitter and/or receiver associated with a particular antenna of the antenna array 50, and so forth. In some instances, the application processor 35 may be integrated with the processor 12 and perform additional functions related to the wireless communications, such as functions related to the display 18, adjusting bandwidth consumption, and so forth.

In some embodiments, the application processor 35 may communicate with one or more memory devices (not shown), such as the memory 14 of FIG. 1, for processing instructions to perform the functions related to wireless communications. The memory device may store information such as control software, configuration data, etc. In some embodiments, the application processor 35 and the memory device may be external to the main logic board 33 and/or the system package 30. The memory device may include a tangible, non-transitory, machine-readable-medium, such as a volatile memory (e.g., a random access memory (RAM)) and/or a nonvolatile memory (e.g., a read-only memory (ROM)). The memory may store a variety of information and may be used for various purposes. For example, the memory device may store machine-readable and/or processor-executable instructions (e.g., in the form of software or a computer program) for the application processors 35 to execute, such as instructions for enabling communication from a particular antenna transmitting or receiving signals contributing to a beamformed signal transmitted or received in a particular beam direction at a particular frequency. The memory device may include one or more storage devices (e.g., nonvolatile storage devices) that may include read-only memory (ROM), flash memory, a hard drive, or any other suitable optical, magnetic, or solid-state storage medium, or a combination thereof.

As shown, the system package 30 also includes the front glass panel 32, which may include one or more printed circuit boards that are coupled to a cover glass associated with the display 18. The front glass panel 32 may include a second antenna array 50B having M×N first band antennas 51, M×N second band antennas 53, and/or M×N third band antennas 55. The antennas of the second antenna array 50B function similarly to the antennas of the first antenna array 50A of the main logic board 33. That is, by way of example, the first band antennas 51 may communicate wireless signals on low-bands frequencies (e.g., 700 MHz to 1.0 GHz), the second band antennas 53 may communicate wireless signals on mid-band frequencies (e.g., 1.8 GHz to 2.2 GHz), and the third band antennas 55 may communicate wireless signals on high-band frequencies (e.g., 20 GHz to 80 GHz).

The front glass panel 32 may also include the amplifier RFIC 42 (e.g., a low noise amplifier (LNA) and power amplifier (PA) radio frequency integrated circuit (RFIC)) and the power management module 41. The amplifier RFIC 42 may include circuitry between antennas and mixing circuitry that, for example, process a signal at an incoming radio frequency (RF) before the signal is converted or demodulated to a lower intermediate frequency (IF) for processing (e.g., converting from RF to IF). By way of example, the amplifier RFIC 42 may include a processor 12 that processes instructions for functions performed by the amplifier RFIC 42 (e.g., instructions related to frequency conversion, transmitting signals from particular antennas and having particular amplification, receiving signals at particular antennas, etc.) and/or a memory 14 storing the instructions related to functions performed by the amplifier RFIC 42. In some embodiments, the amplifier RFIC 42 may include a band-pass filter to pass frequencies within a particular range and/or a stop-band filter to filter frequencies out the particular range, a low noise amplifier to increase a signal strength of an incoming signal, a local oscillator that generates a radio frequency signal at an offset from the incoming signal to be mixed with the incoming signal, and/or a mixer that mixes the incoming signal with a signal from the local oscillator to convert the incoming signal to the intermediate frequency. A power convertor (e.g., a direct current (DC)-to-DC convertor (DC-DC convertor)) of the power management module 41 may supply power to the power amplifier of the electronic device 10, for example, for amplifying a transmission signal. As such, dynamically changing the supply voltage from the power convertor may correspondingly change the amount of amplification to the transmission signal from the power amplifier. Furthermore, an average power tracking (APT) of the power management module 41 may change the DC supply voltage based on an output power level to maintain linearity of the power amplifier while efficiency may be improved (e.g., reduce unnecessary power consumption by the power amplifier).

As illustrated, the system package 30 also includes the left side panel 36, which may include one or more printed circuit boards that are connected to a left side of the electronic device 10. The left side panel 36 may also include a power management circuitry 39, a transceiver 20, and third antenna array 50C. Similarly, the system package 30 includes a right side panel 38. The right side panel 38 also may also include a power management circuitry 39, a transceiver 20, and a fourth antenna array 50D. The power management circuitry 39, the transceivers 20, and the antenna arrays 50 may operate and function similarly to the power management circuitry 39, the transceiver 20, and the antenna array 50A, as discussed with respect to the main logic board 33. As shown, the third antenna array 50C and the fourth antenna array 50D include M×N first band antennas 51, second band antennas 53, and third band antennas 55. As previously mentioned, by way of example, the first band antennas 51 may communicate wireless signals on low-band frequencies, the second band antennas 53 may communicate wireless signals on mid-band frequencies, and the third band antennas 55 may communicate wireless signals on high-band frequencies.

As previously discussed, integrating the antennas of the antenna arrays 50, the transceivers 20, and the power management circuitry 39, within the same particular area within a package of the panels of the system package 30 may be difficult. Specifically, a transceiver 20 and an antenna array 50 may be co-located (e.g., near each other in the same or approximately the same area) in the package so that the transceiver 20 may efficiently control amplification, phase, gain, and so forth, of the wireless signals while minimizing signal loss and noise that may otherwise result from longer communication pathways between the transceiver 20 and the antenna array 50 (e.g., not co-located). Similarly, the power management circuitry 39 may be co-located with the transceiver 20 and the antenna array module 60 so that the transceiver 20 may efficiently control power related functions for the wireless signals from the antennas of the antenna array 50 while also minimizing signal loss and noise. Moreover, the electronic device 10 may include additional antennas for higher data throughput via the antennas and/or to provide higher gain of the wireless signals from the antennas. In some instances, the electronic device 10 may include additional components and/or additional antennas to accommodate a carrier aggregation that is unique to a particular wireless carrier. As will be described herein, the system package 30 may efficiently accommodate the co-located components, the additional number of antennas, other components, and/or package specifications, while conserving space (e.g., maintain initial system package 30 dimensions after adding additional components and antennas). Although the following descriptions describe space conservation packaging techniques applied to a particular panel of the system package 30, the techniques may also apply to the other panels of the system package 30. By way of example, descriptions of the space conservation packaging techniques applied to the front glass panel 32 may also apply to the main logic board 33, the back glass panel 34, the left side panel 36, and/or the right side panel 38.

Figure 8:
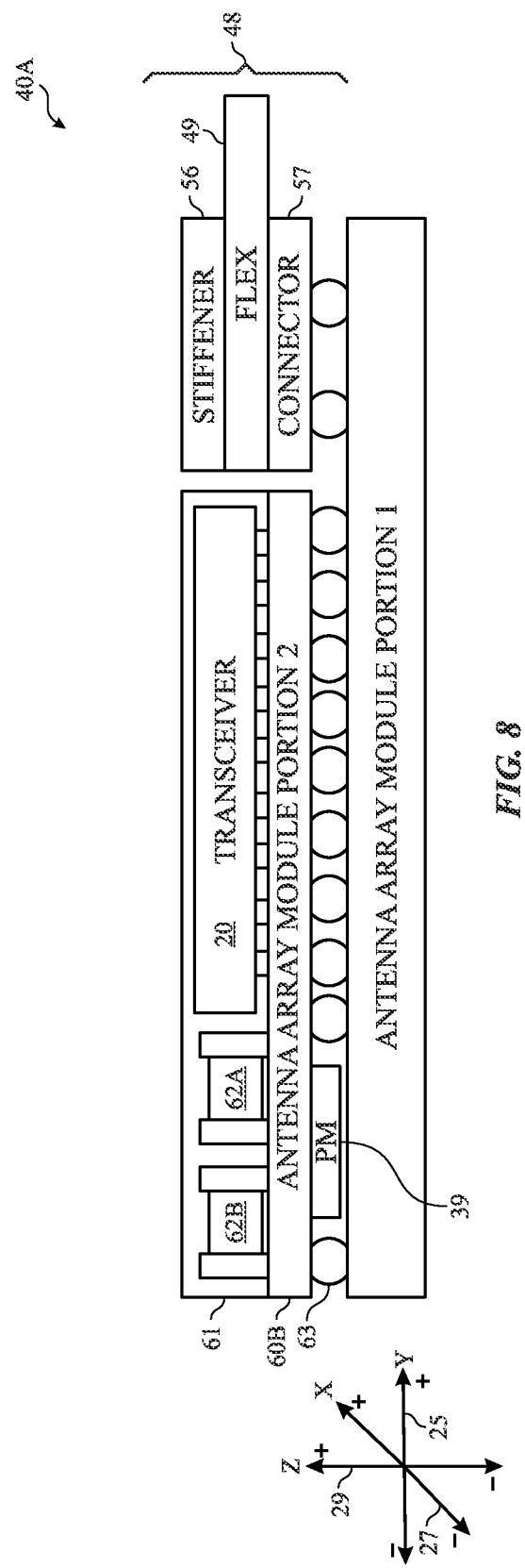
FIG. 8 is a schematic diagram of a package of a left side panel with a distributed antenna array module of the system package of FIG. 7, according to embodiments of the present disclosure.

To illustrate, FIG. 8 is schematic diagram of a package 40A of the left side panel 36 with a distributed antenna array module 60, which includes the third antenna array 50C. The antenna array module 60 (e.g., assembly) is distributed into two portions: a first antenna array module portion 60A (e.g., having a first antenna substrate or system in package (SIP) substrate) and a second antenna array module portion 60B (e.g., having a second antenna substrate) that are connected or electrically coupled by solder balls 63. Although the following descriptions of the antenna array module 60 describe two antenna array module portions 60A, 60B, which represents a particular embodiment, the package 40A may instead include one or more antenna array module portions 60A, 60B (e.g., two, three, six, etc.). Additionally, although the following descriptions describe the antenna array module portions 60A, 60B as including a particular number of antenna array layers and/or having particular dimensions, which represents a particular embodiment, the package 40A may instead include the antenna array module portions 60A, 60B as including one or more antenna array layers and/or having varying dimensions (e.g., varying height, width, and/or length of the portions). Briefly, and as will be described in detail herein, fragmentizing the antenna array module 60 into the distributed antenna array module portions 60A, 60B may facilitate placing the antenna array circuitry in multiple available areas within the package 40A rather than restricting placement to one larger area of the package 40A. By freeing up the larger area, the antenna array module portions 60A, 60B may be placed according to other components (e.g., dimensions of the other components) within the package 40A. That is, the antenna array module portions 60A, 60B may be placed in smaller spaces and/or gaps within the package 40A while providing the same overall functionality of the antenna array module portion 60 as a single piece. Also, freeing up the larger area enables fitting additional components in the package 40A and/or within spaces or gaps between the antenna array module portions 60A, 60B.

The solder balls 63 may be placed between silicon components, such as but not limited to modules, boards, packages, and/or the like, to provide contact that enables a communication path between the silicon components. In some embodiments, as depicted, the package 40A may include solder balls 63 placed between the antenna array module portions 60A, 60B. In additional or alternative embodiments, the package 40A may include the solder balls 63 placed between the antenna array layers within the antenna array module portions 60A, 60B, as well as between the modules, boards, packages, and/or other components within the package 40A. By way of example, the solder balls 63 may be placed on pads on the first antenna array module portion 60A to provide contact and a communication path to the second antenna array module portion 60B.

The package 40A of the left side panel 36 may also include mold 61. The mold 61 may be a cured resin or rubber that is fixed to the one or more printed circuit boards of the package 40A. In other implementations, the mold 61 may be formed by solidification of a liquid, resin, or a gel placed on the top of the printed circuit boards. The liquid, resin, or gel may then be cured in place to produce the mold 61. In general, the mold 61 may embed or encase the silicon components, such as modules, boards, packages, and/or the like of the package 40A. The mold 61 may provide support to the modules, boards, packages, and/or other components. In some embodiments, the mold 61 may be carved or cut to accommodate the silicon components of the package 40A. By way of example, the mold 61 may be carved to accommodate new or different placements of the distributed antenna array module portions 60A, 60B (e.g., portions). Moreover, the mold 61 may be distributed into multiple pieces. In particular, as the number of smaller silicon pieces of the silicon components increases, such as by distributing a single piece of a silicon component (e.g., the antenna array module 60) into multiple portions (e.g., the first and the second antenna array module portions 60A, 60B) that are placed in various areas of the package 40A and have various dimensions, the number of pieces of mold 61 may correspondingly increase. The placement of the mold 61 and/or the dimensions of the pieces of mold 61 may be based on the positioning or layout of the pieces of the silicon component (e.g., distributed pieces of the silicon component).

As shown, the left side panel 36 also includes the transceiver 20, the power management circuitry 39, and the antenna array module portions 60A, 60B of the antenna array module 60 (e.g., including the antenna array 50C). Additionally, the left side panel 36 may include a flexible circuit 48 and radio frequency components 62A, 62B. The flexible circuit 48 may include a stiffener 56, a flex cable 49 (e.g., a flexor), and a connector 57. The transceiver 20, the power management circuitry 39, and the antenna array 50C may operate as discussed with respect to FIG. 7.

Generally, the flexible circuit 48 may include one or more components that enable communication between other components coupled to the flexible circuit 48. That is, the flexible circuit 48 may be communicatively coupled to components (e.g., of packages and/or on printed circuit boards) to provide a connection or communicative pathway to other components on the same printed circuit board or another printed circuit board of the electronic device 10 (e.g., another printed circuit board of the same panel or another panel of the system package 30). By way of example, and as depicted, the flexible circuit 48 may communicatively couple to the first antenna array module portion 60A to enable communication between the first antenna array module portion 60A and other components. The stiffener 56 of the flexible circuit 48 may include material that provides mechanical support to the components of the flexible circuit 48 during assembly. Specifically, the stiffener 56 may provide stiffness or hardness to areas that are too flexible to perform intended functions. By way of example, the stiffener 56 may provide rigidness in a package of the flexible circuit 48.

The flex cable 49 may include a flexible substrate that allows the flexible circuit 48 to conform to a particular shape or flex during its use. In some instances, the flex cable 49 may include a cable that provides a board-to-board (B2B) connection from the flexible circuit 48 to the components mounted on the same printed circuit board or another printed circuit board of the electronic device 10. By way of example, the flex cable 49 may provide a connection to the main logic board 33. The connector 57 may be an interconnector between the flexible circuit 48 and the printed circuit board that is coupled to the flexible circuit 48. That is, the connector 57 provide a board-to-board connection (B2B). In the depicted embodiment, the connector 57 provides a connection between the flex cable 49 and the first antenna array module portion 60A. As previously mentioned, the solder balls 63, which provide contact enabling a communication path between contacted components, may provide the contact between the connector 57 and the first antenna array module portion 60A. The connector 57 may provide a path for communicating data from the flex cable 49 (e.g., data received from the components mounted on the same or another printed circuit board of the electronic device 10).

Additionally, the package 40A of the left side panel 36 may include radio frequency components 62, such as a first radio frequency component 62A and a second radio frequency component 62B that are disposed on top (e.g., with respect to the z-axis 29) of the second antenna array module portion 60B. The radio frequency components 62 may include capacitors, inductors, filters, active silicon devices, and/or other radio frequency components that facilitate radio frequency communication. The package 40A may include the power management circuitry 39 near both of the antenna array module portions 60A, 60B for efficient communication (e.g., enabling short communication paths and thus lower latency between power management circuitry 39 and the antenna array module portions 60A, 60B). By way of another example, the package 40A of the left side panel 36 may also include the transceiver 20 near the antenna array module portions 60A, 60B for efficient communication. That is, a reduced path may provide faster and strong signal communication.

In some embodiments, the power management circuitry 39 may be placed in a different area of the package 40A of the left side panel 36. In the depicted embodiment, the power management circuitry 39 may be placed in an upright manner with respect to first antenna array module portion 60A. That is, a bottom surface (e.g., with respect to the z-axis 29) of the power management circuitry 39 may be positioned on top (e.g., with respect to the z-axis 29) of the first antenna array module portion 60A and a top surface (e.g., with respect to the z-axis 29) of the power management circuitry 39 may be positioned beneath (e.g., with respect to the z-axis 29) the second antenna array module portion 60B. In additional or alternative embodiments, the side surfaces (e.g., with respect to the x-axis 27) of the power management circuitry 39 may be positioned vertically (e.g., with respect to the z-axis 29) towards the first antenna array module portion 60A and/or the second antenna array module portion 60B. In some embodiments, the power management circuitry 39 may connect to different silicon components (e.g., the transceiver 20) within the package 40A. In additional or alternative embodiments, an area adjacent to the power management circuitry 39 (e.g., connecting to the first antenna array module portion 60A and/or the second antenna array module portion 60B) may include other mounted or soldered components. By way of example, the area adjacent to the power management circuitry 39 may include capacitors for tuning and/or decoupling and/or filters for filtering or removing unintended components or features from a signal. In additional or alternative embodiments, the area adjacent to the power management circuitry 39 may include components made from other semiconductor materials, such as from group III-V of the periodic table and/or from silicon-on-insulator (SOI). These semiconductor components may provide better power consumption and power sensitivity (e.g., power detection) than the silicon components.

Thus, these space conservation packaging techniques applied to package 40A of the left side panel 36 provides an efficient design for strategically distributing the antenna array module 60 and/or the mold 61 into a number of portions having particular dimensions. The package 40A includes placing the distributed portions of the antenna array module 60 (e.g., the first antenna array module portion 60A and the second antenna array module portion 60B) to fit the package while maintaining the co-location of the transceiver 20, the power management circuitry 39, and the antenna array module portions 60A, 60B including the third antenna array 50C, enabling a space-efficient package. By fragmentizing and distributing the antenna array module 60 into the first antenna array module portion 60A and the second antenna array module portion 60B, such that the antenna array module portions 60A, 60B may be placed in multiple areas of the package 40A, the package 40A gains more free space to add additional components, for example, for new wireless communication parameters (e.g., adding more antennas to provide higher throughput). In particular, the antenna array module portions 60A, 60B may be placed in any x-y-z space (e.g. three-dimension (3D) space as indicated by the y-axis 25, the x-axis 27, and the z-axis 29) of the package 40A. Moreover, each of the antenna array module portions 60A, 60B may be strategically distributed to provide a particular antenna array use. By way of example, and as depicted, the first antenna array module portion 60A may provide the antenna array functionality and/or the antenna array 50 with the antennas, while the second antenna array module portion 60B provides the antenna array routing circuitry. The antenna array routing circuitry may refer to circuitry that routes signals from the transceiver 20 to the antenna array 50.

Figure 9A:
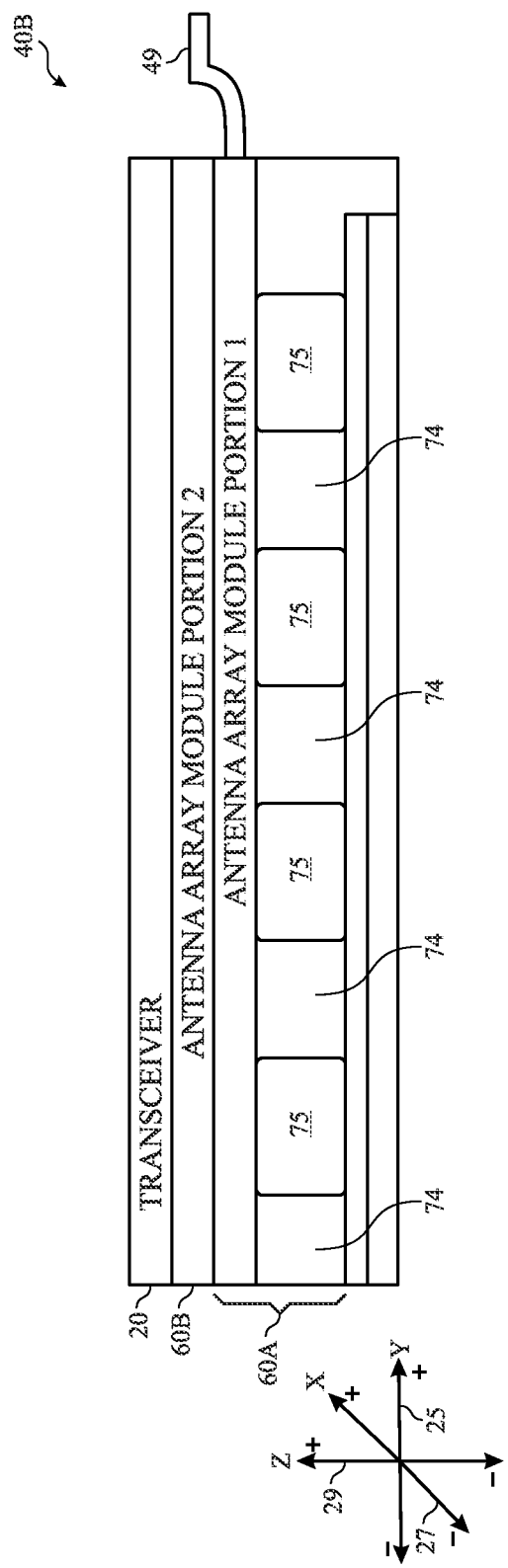
FIG. 9A is a schematic diagram of a package with a flexible cable providing a board-to-board connection, according to embodiments of the present disclosure.

Additionally or alternatively to the package 40A of FIG. 8, the package 40 may include a flex cable 49 without the connector 57. To illustrate, FIG. 9A is a schematic diagram of a package 40B of the left side panel 36 with a flexible cable 49 providing a board-to-board connection. That is, instead of the connector 57 of FIG. 8, the flex cable 49 may provide the board-to-board connection in the package 40B. Eliminating the connector 57 from the package 40A of FIG. 8 may reduce the overall height of the flexible circuit 48. That is, the dimensions of the flexible circuit 48 may decrease with respect to the z-axis 29 of the 3D space, providing additional space within the package 40B. As shown, the package 40B may include the transceiver 20 and the first and second antenna array module portions 60A, 60B. These components may function similarly as described with respect to FIG. 8.

In the depicted embodiment, the flex cable 49 replaces the connector 57 from the package 40A of FIG. 8. In particular, the flex cable 49 provides the functionalities of the connector 57 and thus, obviates the need for the connector 57, the stiffener 56, as well as the solder balls 63 that connect the connector 57 to the first antenna array module portion 60A. That is, because the flex cable 49 is supposed to be flexible, the package 40B may not use the stiffener 56 for support. The flex cable 49 may provide signal content directly between coupled components (e.g., without any intermediary or intervening components). For example, the flex cable 49 may communicatively couple the first antenna array module portion 60A to the main logic board 33, and thus, may provide direct communication between the first antenna array module portion 60A and the main logic board 33 (e.g., the transceiver 20 of the main logic board 33), without any intermediary or intervening components. As such, the package 40B may eliminate or not include the connector 57 of the package 40A of FIG. 8 and, instead, use the flex cable 49 for routing data and providing a direct communication path between the first antenna array module portion 60A and the main logic board 33. In some embodiments, the flex cable 49 may communicatively couple multiple components of the same package, such as the first antenna array module portion 60A and the second antenna array module portion 60B. As such, the flex cable 49 may communicate data between both the first antenna array module portion 60A, the second antenna array module portion 60B, and/or components on the main logic board 33.

As previously mentioned, the package 40B of the left side panel 36 gains additional space along the z-axis 29 of the 3D space when compared to the package 40A of FIG. 8 by eliminating the connector 57. The additional space may accommodate additional and/or different components, such as additional antennas. For example, the package 40B of the left side panel 36 may include the antenna array module 60 with additional layers for additional antennas and/or circuitry supporting antenna functions. The additional layers may include third band antennas 55 and/or circuitry supporting the third band antennas 55 (e.g., high-band antennas) for mmWave communications.

In some embodiments, and as will be discussed in detail with respect to FIG. 12 and FIG. 13, the first antenna array module portion 60A may include cavities 74. Antennas 75 (e.g., the first band antennas 51, the second band antennas 53, and the third band antennas 55) may be placed inside the cavities 74. That is, the antenna array module 60, which includes the antennas 75 of the antenna array 50C, may be distributed into multiple portions to enable a controller or a processor of the electronic device 10 (e.g., processor 12 of FIG. 1) to locally control the antennas 75. The first antenna array module portion 60A may include the antenna routing circuitry (e.g., circuitry from the transceiver 20 to the antenna array 50C), as well as the cavities 74 with the individual antennas 75. Specifically, the package 40B may include the first antenna array module portion 60A with a distributed antenna array 50C within one or more portions having one or more antennas 75. In some embodiments, each antenna 75 may be placed in a respective cavity 74. In such embodiments, the first antenna array module portion 60A may efficiently provide the appropriate antenna routing to each antenna 75 disposed in the respective cavity 74. By way of example, the first antenna array module portion 60A may enable the processor to locally control amplification for reception signals or transmission signals from the antennas 75. In some embodiments, the first antenna array module portion 60A may be distributed to include one or more portions having one or more capacitors or silicon devices for tuning the antennas 75, radio frequency band switches, and/or other antenna related components. The cavities 74 with the antennas 75 may enable radiating wireless signals from the left side of the electronic device 10 (e.g., from the negative x-axis 27). Similarly, cavities 74 with the antennas 75 of a package 40B of the right side panel 38 may enable radiating wireless signals from the right side of the electronic device 10.

Figure 9B:
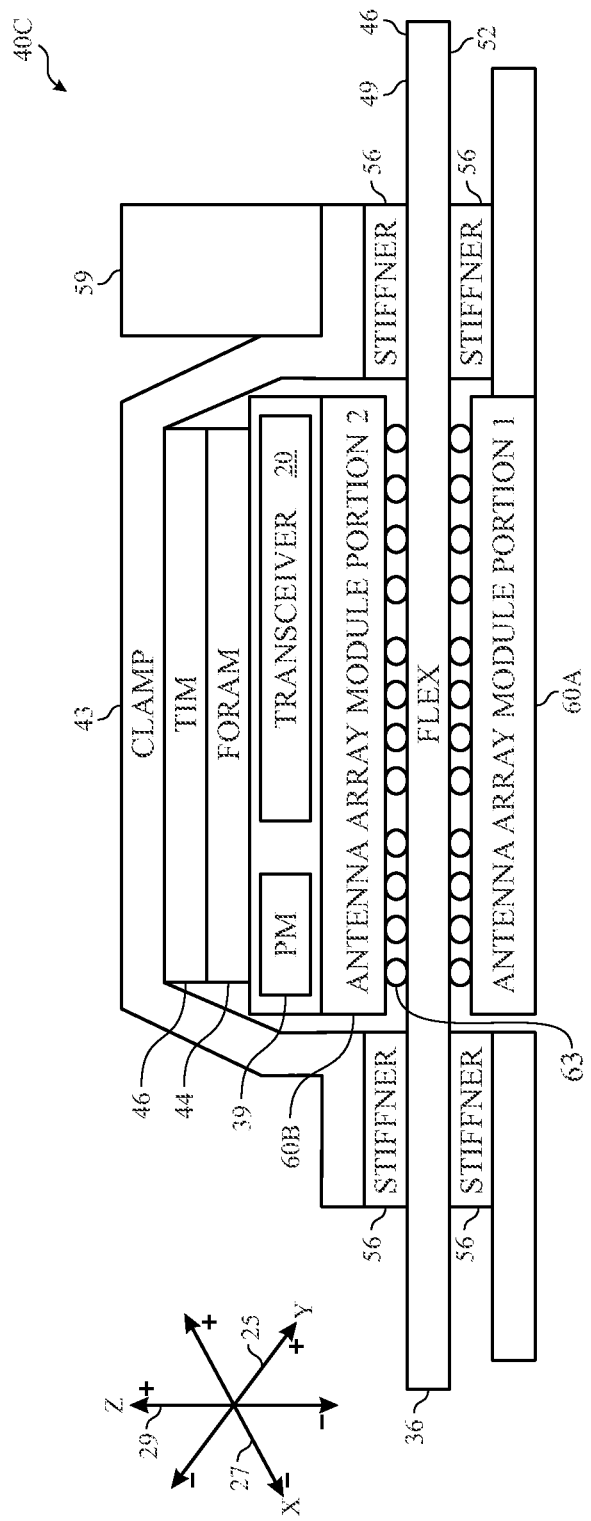
FIG. 9B is a schematic diagram of a package with a flexible cable coupling packaging on top of the flexible cable and below the flexible cable, according to embodiments of the present disclosure.

FIG. 9B is schematic diagram of a package 40C of the left side panel 36 with the flex cable 49 coupling packaging to a flex top surface 46 of the flex cable 49 and to a bottom flex surface 52 of the flex cable 49 (e.g., vertical communication within the package 40C). As shown, the package 40C may include the power management circuitry 39, the transceiver 20, the stiffener 56, the first antenna array module portion 60A, and the second antenna array module portion 60B. These components may function similarly as described with respect to FIG. 8. As previously mentioned, the package 40C may include the flex cable 49 that provides the same or approximately the same functions provided by the connector 57, which is eliminated in the package 40C as compared to the package 40A shown in FIG. 8. As such, the flex cable 49 may provide general flexor functions, such as providing a physically flexible or bendable communication pathway that may carry data signals between components on printed circuit boards coupled to a first side or end of the flex cable 49 and components connected to a second side or end of the flex cable 49.

The flex cable 49 may transfer data between components coupled above and/or below on the flex top surface 46 and/or the flex bottom surface 52 of the flex cable 49. To illustrate, the first antenna array module portion 60A couples to the flex bottom surface 52 of the flex cable 49 and the second antenna array module portion 60B couples to the flex top surface 46 the flex cable 49 via solder balls 63. In additional or alternative embodiments, the flex cable 49 may couple to and communicate with components mounted on either end of the flex cable 49. In some embodiments, the components may be mounted directly onto the flex cable 49 (e.g., without solder balls 63).

Moreover, by eliminating the connector 57 (e.g., of package 40A of FIG. 8) and providing the corresponding functionality in the flex cable 49, the package 40C of the left side panel 36 may gain free space 59. By way of example, the free space 59 may include a 20 millimeter$^2$ (mm$^2$) to 25 mm$^2$ area. The free space 59 may accommodate upgrading the size of existing components (e.g., to increase the functionality or resources provided by those components), adding new components, and/or deconstructing certain silicon components (e.g., packages, modules, and/or layers of the portions) and adding the deconstructed silicon components to the free space 59 to decrease the overall 1 size of the package 40C and/or the electronic device 10.

As shown, the power management circuitry 39 and the transceiver 20 are placed on top of the second antenna array module portion 60B (e.g., with respect to the z-axis 29), which represents a particular embodiment. In other embodiments, the power management circuitry 39 and the transceiver 20 may be placed inside a silicon portion of an embedded die that is placed on top of the second antenna array module portion 60B (e.g., with respect to the z-axis 29), such that the power management circuitry 39 and the transceiver 20 are no longer visible from outside the embedded die. Additionally or alternatively, the power management circuitry 39 and the transceiver 20 may be placed on top of the flex cable 49 (e.g., with respect to the z-axis 29) or elsewhere in the package 40C, and the second antenna array module portion may be combined with the first antenna array module portion 60A (e.g., in antenna layer constructed as a single piece). In any case, the power management circuitry 39 and the transceiver 20, as well as the other components, may be moved and/or distributed to be efficiently placed within the package 40C based on co-location and/or packaging size specifications associated with the left side panel 36.

Figure 9C:
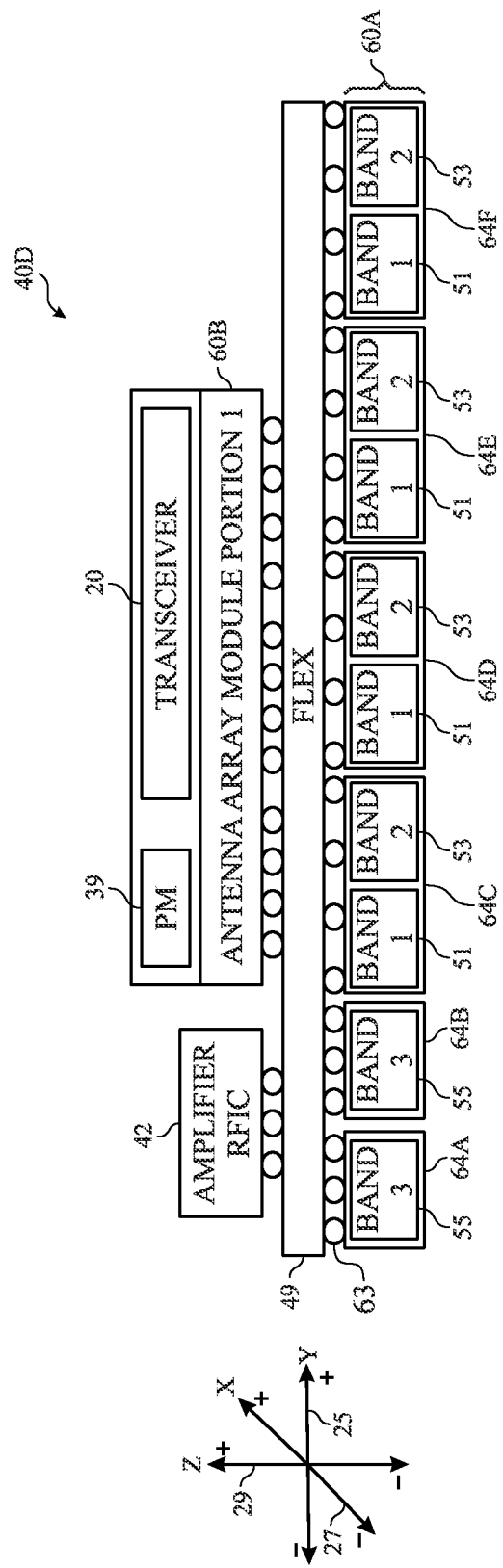
FIG. 9C is a schematic diagram of a package with the flexible cable providing a connection between portions of a distributed antenna array module, according to embodiments of the present disclosure.

In some instances, for example, if the package 40C includes an amplifier RFIC 42, the package 40C may fit the amplifier RFIC 42 in the free space 59 gained from eliminating the connector 57 of the package 40A of FIG. 8. In some embodiments, the package 40C may gain additional area by deconstructing silicon or distributing silicon components, such as the first antenna array module portion 60A. To communicate data between the amplifier RFIC 42 and the antennas associated with the amplifier RFIC 42, the antennas may be placed or coupled to the flex cable 49, opposite the amplifier RFIC 42. To illustrate, FIG. 9C is a schematic diagram of the package 40D of the front glass panel 32 with the flex cable 49 coupling antennas of the first antenna array module portion 60A and the amplifier RFIC 42. As shown, the package 40D may include the power management circuitry 39, the transceiver 20, the first and second antenna array module portions 60, and the amplifier RFIC 42. These components may function similarly as described with respect to FIG. 8.

As previously mentioned, by eliminating the connector 57 of the package 40A of FIG. 8 and including the same functionality in the flex cable 49, as well as deconstructing the silicon, the package 40D may gain free space 59. The additional space may provide an area to place the amplifier RFIC 42 near or co-located with the antenna array module portions 60A, 60B. As previously discussed, the amplifier RFIC 42 may efficiently amplify and/or convert signals when placed closed to the antennas that transmit and/or receive the wireless signals due the short travel distance. The distance may be based on the dimensions and/or a number of antennas in an antenna array 50. By way of example, the distance may range from approximately 0 to 50 mm (e.g., 10 mm, 20 mm, 30 mm) for a 1×2 antenna array 50, a 2×4 antenna array 50, or a 1×8 antenna array 50.

As such, the space conservation packaging techniques applied to the package 40D of the front glass panel 32 including elimination of the connector 57 of the package 40A of FIG. 8 and/or enabling the flex cable 49 to receive data from components (e.g., on or off package) and to communicate data to coupled panels on the package 40D, may provide space to place the amplifier RFIC 42 near the antennas of the first antenna array module portion 60A and the second antenna array module portion 60B, while enabling more efficient wireless communication.

In some embodiments, the antenna array module portions 60A, 60B may be further distributed into multiple portions or segments. For example, and as shown, the first antenna array module portion 60A may be distributed into portions that each include one or more antennas. In some embodiments, the antennas may be distributed based on antenna type (e.g., first band antennas 51, second band antennas 53, or third band antennas 55), antenna circuitry, antenna use (e.g., for transmission or reception), and so forth. To illustrate, the depicted embodiment shows the first antenna array module portion 60A distributed into six portions 64A-F based on the antenna type. That is, each of the portions 64 include one or more of the first band antenna 51, the second band antenna 53, and/or the third band antenna 55 of the first antenna array module portion 60A. In some embodiments, each of the portions 64 may also include the circuity to support the respective antenna(s). By way of example, the antenna array module 60 may include sixteen metal layers (e.g., silicon layers) that include the antennas, antenna circuitry for functionality and routing, and so forth. The antenna array module 60 may be distributed into the second antenna array module portion 60B and six smaller portions 64A-F (e.g., making up the first antenna array module portion 60A). By way of example, the second antenna array module portion 60B may include ten metal layers with wireless communication routing. Additionally, the six portions 64A-F of the first antenna array module portion 60A may be coupled to the flex cable 49. Since the flex cable 49 is flexible, such that the flex cable 49 may be bendable to various angles (e.g., 0° up to 360°), the antennas of the first antenna array module portion 60A may be positioned at the corresponding various angles (e.g., positioned in a tilted manner) while remaining coupled to the flex cable 49. In contrast, antennas disposed on a plane (e.g., printed circuit board) may be limited to a positioning range smaller than the positioning range for the flex cable 49. For example, antennas fixed to the plane may be positioned perpendicular (e.g., 90°) with respect to the plane, while antennas coupled to the flexible cable 49 may be positioned at various angles including non-perpendicular angles (e.g., between 1° and 359°, between 10° and 350°, between 30° and 330°, between 50° and 310°, and so on) with respect to the plane by bending the flexible cable 49. As such, the antennas coupled to the flex cable 49 may radiate wireless signals at the non-perpendicular angles.

The signals communicated over high-band frequencies (e.g., signals communicated over mmWave) may be more susceptible to signal loss than signals communicated over mid-band or low-band frequencies. As such, the package 40D of the front glass panel 32 may include the amplifier RFIC 42 and the third band antennas 55 (e.g., high-band antennas) of the antenna array portions on either and opposite sides of the flex cable 49. That is, the flex cable 49 may provide a shorter path for communication between the amplifier RFIC 42 and the third band antennas 55 (e.g., when compared to communication paths between the amplifier RFIC 42 and the first band or second band antennas 51, 53). Additionally or alternatively, the package 40D may position the antennas in a sequential or alternating manner, such as from the negative to the positive x-axis 27 (e.g., a first portion 64A including a first band antenna 51 and a second band antenna 53, a second portion 64B including a third band antenna 55, a third portion 64C including a first band antenna 51 and a second band antenna 53, and so forth).

Figure 10:
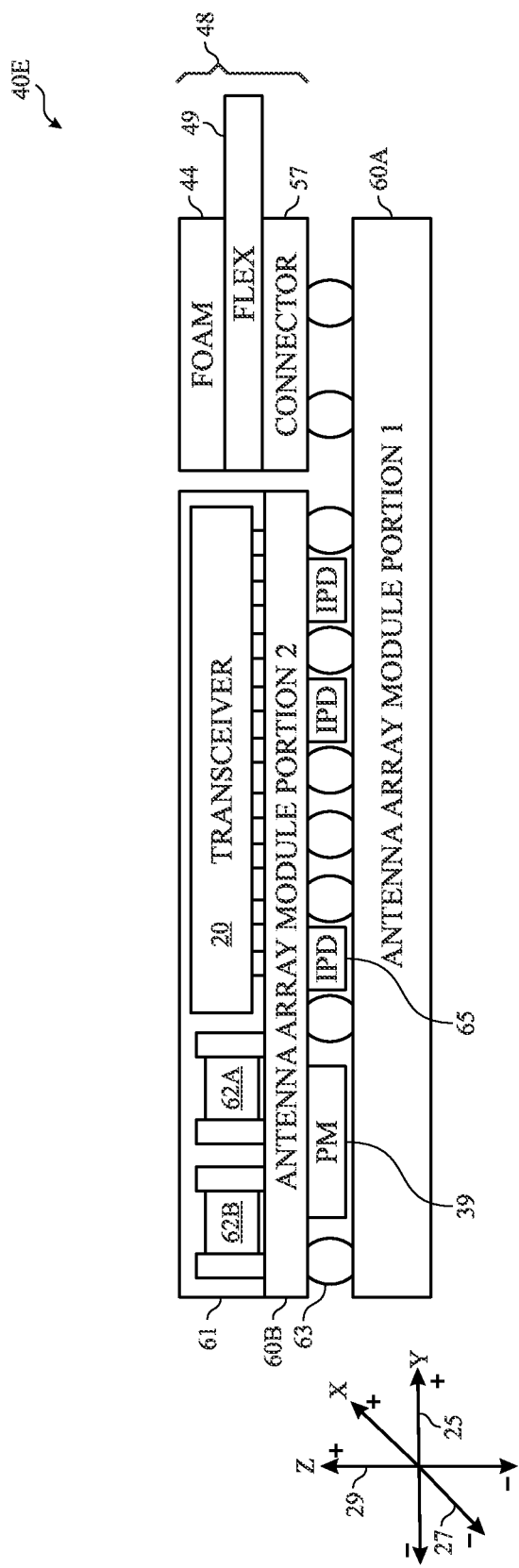
FIG. 10 is a schematic diagram of a package with power management circuitry directly coupled to a distributed antenna array module, according to embodiments of the present disclosure.

FIG. 10 illustrates a schematic diagram of a package 40E of the left side panel 36 with the power management circuitry 39 directly coupled to the distributed antenna array module 60 including the first antenna array module portion 60A and the second antenna array module portion 60B. As shown, the package 40E includes the transceiver 20, the power management circuitry 39, and the antenna array module 60 including the first antenna array module portion 60A and the second antenna array module portion 60B electrically coupled via solder balls 63. The package 40E also includes the flexible circuit 48 and first and second radio frequency components 62A, 62B (e.g., capacitors, inductors, filters, active silicon devices, and/or other like radio frequency components). As previously discussed, the flexible circuit 48 may include the stiffener 56, the flex cable 49, and a connector 57. These components may operate as discussed with respect to FIGS. 7 and 8. Although the following descriptions describe the package 40E with a distributed antenna array module 60 with the first antenna array module portion 60A and the second antenna array module portion 60B, which represents a particular embodiment, the package 40E may instead include a single antenna array module 60 and a power control module coupled via the solder balls 63. Specifically, the power control module may operate similar to the power management module 41, as described with respect to FIG. 7.

As shown, the power management circuitry 39 may be placed adjacent to the antenna array module 60 including the first antenna array module portion 60A and the second antenna array module portion 60B, such that the power management circuitry 39 is directly coupled to the antenna array module 60 and thus, is co-located to the antenna array module 60. In the depicted embodiment, a bottom side of the power management circuitry 39 that is facing the negative z-axis 29 may be coupled to the first antenna array module portion 60A while a top side facing the positive z-axis 29 of the power management circuitry 39 is coupled to the second antenna array module portion 60B. The power management circuitry 39 may be in direct contact with the antenna array module 60, such that the power management circuitry 39 does not use interconnecting materials (e.g., solder balls 63) to connect or communicate with the antenna array module 60. In particular, the power management circuitry 39 may directly couple to or attach to an exposed surface of the antenna array module 60. The power management circuitry 39 may also be co-located to the transceiver 20. The co-location of the power management circuitry 39 to the transceiver 20 and the antenna array module 60 may enable the power management circuitry 39 to efficiently control power related functions for wireless signals from the antennas of the antenna array module 60 while reducing or minimizing signal loss and/or noise.

The package 40E of the left side panel 36 may also include integrated passive devices 65 (IPD), such as resistors, inductors, capacitors, and/or baluns. Here, the integrated passive devices 65 are coupled (e.g., directly coupled) to the second antenna array module portion 60B. Generally, the integrated passive devices 65 may enable or facilitate impedance tuning and/or matching to reduce or minimize power loss and enhance wireless signal transmission. Impedance matching may facilitate transferring a signal from a source to a load (e.g., an antenna for transmission) with reduced or minimal signal loss (e.g., reducing or minimizing signal reflection along the path from the source to the load).

Moreover, the package 40E of the left side panel 36 includes the first radio frequency component 62A and the second radio frequency component 62B on top of the second antenna array module portion 60B (e.g., with respect to the z-axis 29). The dimensions of the radio frequency components 62 may be based on available space within the package 40E, and the available space may be based on the co-location of the power management circuitry 39, transceiver 20, and antenna array module 60, as well as the number of antennas for communicating using the left side panel 36.

Figure 11:
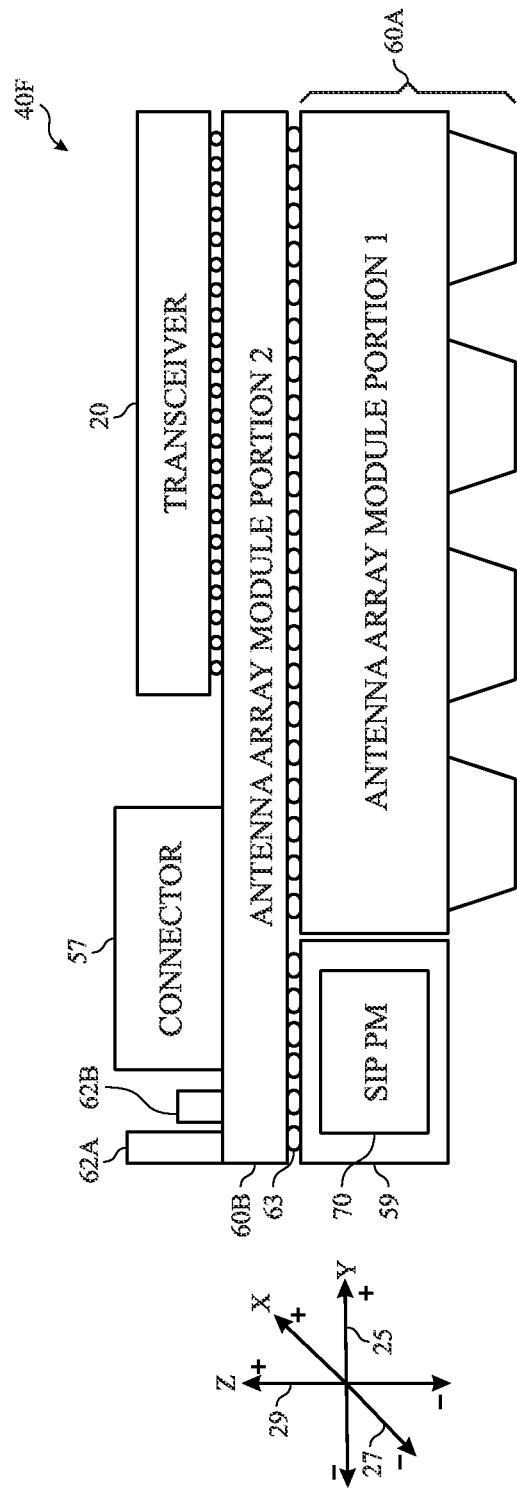
FIG. 11 is a schematic diagram of a package with a power management package, according to embodiments of the present disclosure.

In some embodiments, the packaging may include a system-in-package (SiP) for the power management circuitry 39. To illustrate, FIG. 11 is a schematic diagram of a package 40F of the left side panel 36 with a power management package 70. The power management package 70 may be a system-in-package for the power management circuitry 39 that includes one or more integrated circuits enclosed in one or more chip carrier packages that are stacked (e.g., using a package on package (PoP) technique). The power management package 70 may perform power-related functions for the left side panel 36. The one or more integrated circuit dies may be stacked vertically on a substrate and may be internally coupled by wires bonded to the package or by solder bumps that are used to join the integrated circuit dies together in the stack. The power management package 70 may also include supporting circuitry to support the power-related functions.

In some embodiments, the power management package 70 may have a large z-axis 29 volume or depth to support the integrated circuit dies and/or the circuitry in the package. By way of example, the power management package 70 may have height ranging from 0.1 mm to 2.5 mm (e.g., 0.5 mm, 2 mm, 2.5 mm, and so forth). To provide space for the power management package 70, the package 40F may include smaller or shorter antennas in the antenna array module 60, such as the depicted first antenna array module portion 60A. In particular, the width of the antenna array module 60 along the x-axis 27 may be reduced to gain free space for placing the power management package 70. Additionally or alternatively to reducing the dimension of the antenna array module 60 along the x-axis 27, the height along the z-axis 29 and/or the length along the y-axis 25 may be reduced to provide the free space. In this manner, the package 40F gains free space that was previously used by the larger antenna array module 60. The package 40F with the smaller antennas provides space for silicon components (e.g., modules, boards, and/or packages) adjacent to the first antenna array module portion 60A.

Moreover, since the power management package 70 is a separate package, for example, from the other components attached to the printed circuit boards in the package 40F, the power management package 70 may be tested individually. By way of example, testing may include a test of each of the integrated circuit dies, components within the power management package 70 (e.g., passive and/or active devices), the supporting circuitry, routing between the dies and/or circuitry, connectivity to other silicon components within the package 40F of the left side panel 36.

Additionally, by using smaller or shorter antennas in the first antenna array module portion 60A, such that the first antenna array module portion 60A may be shortened along the x-axis 27 (e.g., in width) and the power management package 70 may be placed in the freed space, free space 59. The radio frequency components 62, which may include resistive components, may be replaced with larger resistive components, including but not limited to, larger resistors, inductors, capacitors, resonators (e.g., acoustic and/or mechanical), and so forth, that are surface mount components. By way of example, the larger resistive components may have dimensions in a range of approximately 0.2 mm×0.1 mm (e.g., 0.008 inches×0.005 inches) to 2.0 mm×2.5 mm. That is, the power management circuitry 39 that was previously placed on top of the wider first antenna array module portion 60A (e.g., along the z-axis 29) in the package 40E of FIG. 10 may be replaced with the power management package 70. The replacement provides the package 40F with additional space along the z-axis 29 (e.g., in height) on top of the first antenna array module portion 60A. Moreover, removing the power management circuitry 39 provides the package 40F with space to extend the second antenna array module portion 60B along the x-axis 27. The additional free space in both the x-axis 27 and the z-axis 29 directions within the 3D space of the package 40F may accommodate different dimensions of the radio frequency components 62, including different dimensions of resistive components. For example, the radio frequency components 62, such as inductors and/or capacitors, may include taller radio frequency components 62, such as buck convertors, boost convertors, and/or buck-boost convertors. Additionally or alternatively, the radio frequency components 62 may include larger capacitors, which store energy more efficiently than smaller capacitors.

In some embodiments, and as previously mentioned, the package 40 may include pockets or cavities that are formed in a portion of the antenna array module 60. In particular, the cavities may be formed by removing, drilling, layering out, laser drilling, sand blasting, and the like, portions of the antenna array module 60. In some embodiment, the antenna array module 60 may be composed of laminate or ceramic material. Thus, by removing portions of the laminate or ceramic material, the package 40 may expose surfaces of antennas and make the antennas more easily accessible. As such, the exposed areas of the antennas may connect to other components, such as capacitors, switches, diodes, amplifiers (e.g., low noise amplifiers, power amplifiers), receivers, and so forth. The connection between the antennas and the other components may provide a variety of wireless communication functions, such as tuning the antennas using the other components. To illustrate, FIG. 12 is a schematic diagram of a package 40G of the left side panel 36 with cavities 74 in the first antenna array module portion 60A. As shown, the package 40G includes the transceiver 20, the antenna array module 60 including the first antenna array module portion 60A and the second antenna array module portion 60B that are electrically coupled via solder balls 63, the radio frequency components 62, the connector 57 that couples to the main logic board 33 (as indicated by the dashed line box) via the flex cable 49, and the power management package 70. These components may operate as discussed with respect to FIGS. 7 and 8. Additionally, although the following descriptions describe the package 40G with a distributed antenna array module 60 with the first antenna array module portion 60A and the second antenna array module portion 60B, which represents a particular embodiment, the package 40G may instead include a single antenna array module 60 electrically coupled to a power control circuitry 39 (e.g., on top of the single antenna array module 60 with respect to the z-axis 29) via solder balls 63. The power control circuitry may operate similar to the power management module 41, as described with respect to FIG. 7.

As shown, the package 40G of the left side panel 36 includes the first antenna array module portion 60A having sub-antenna array portions 72, including a first sub-antenna array portion 72A, a second sub-antenna array portion 72B, a third sub-antenna array portion 72C, and a fourth sub-antenna array portion 72D. Each of the sub-antenna array portions 72 may include one or more antennas, such as the first band antennas 51, the second band antennas 53, and/or the third band antennas 55. Additionally or alternatively, the sub-antenna array portions 72 may include routing related to the wireless communications, such as routing between components utilized when transmitting the transmission signals and/or receiving the reception signals, and the antennas. In some embodiments, the sub-antenna array portions 72 may include mold (e.g., pieces of mold) and/or dielectric materials with a high dielectric constant (e.g., high k).

In some embodiments, by implementing the sub-antenna array portions 72 that include antennas and/or antenna functionality (e.g., routing between components), the package 40G may provide additional space within the first antenna array module portion 60A. For example, the first antenna array module portion 60A may include cavities 74 (e.g., gaps or air pockets). The cavities 74 may encase components that may otherwise be coupled to the first antenna array module portion 60A. As shown, the package 40G includes cavities 74 along the bottom side (e.g., with respect to the z-axis 29) of the first antenna array module portion 60A. As previously mentioned, the antenna array module 60, including the first antenna array module portion 60A and the second antenna array module portion 60B, includes a silicon substrate. The cavities 74 may be formed by an etching process or a similar process that may form cavities 74 within the antenna substrate of the first antenna array module portion 60A. Although the depicted embodiment shows cavities 74 along the bottom side, which represents a particular embodiment, the package 40G may include cavities 74 anywhere within the first antenna array portion 60A, such as along the top side in the positive z-axis 29, right side in the positive x-axis 27, left side in the negative x-axis 27, in the middle rather than a side, and so forth.

Figure 12:
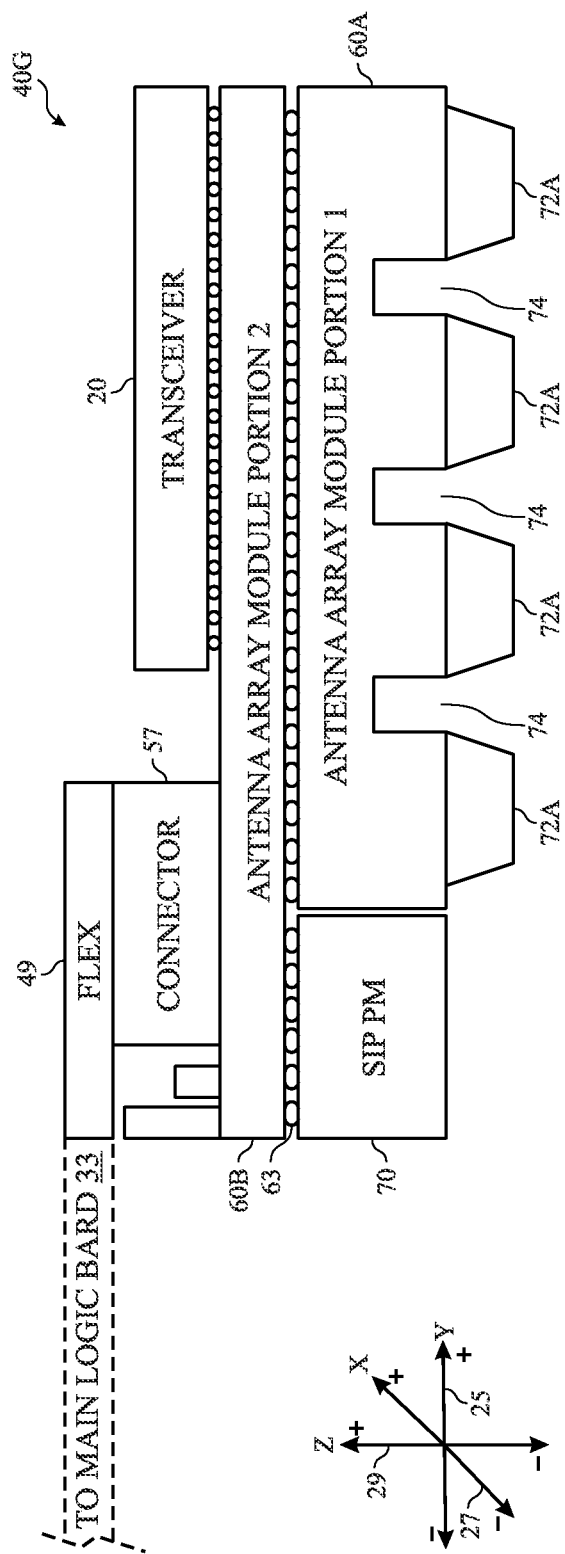
FIG. 12 is a schematic diagram of a package with a distributed antenna array module having cavities, according to embodiments of the present disclosure.
Figure 13:
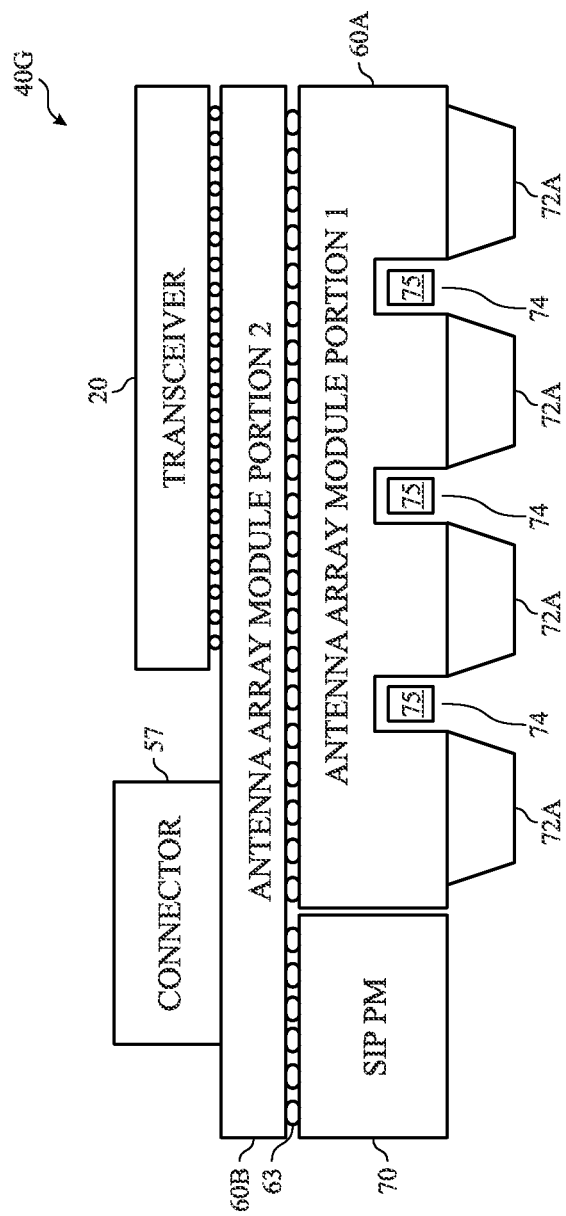
FIG. 13 is a schematic diagram of a package with antennas disposed within the cavities of FIG. 12, according to embodiments of the present disclosure.
Figure 13:
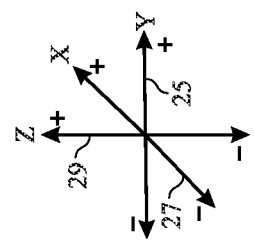

To illustrate the cavities 74 encapsulating components, FIG. 13 is a schematic diagram of a package 40H of the left side panel 36 including antennas 75 disposed within the cavities 74 of FIG. 12. As shown, each of the cavities 74 include at least one respective antenna 75, which may include the first band antennas 51, the second band antennas 53, and/or the third band antennas 55. In some embodiments, the package 40H may include additional antennas 75 (e.g., in the cavities 74) to accommodate mmWave communication. In some embodiments, the left side panel 36 may include, be mounted to, or be placed adjacent to a side glass of the electronic device 10. In such embodiments, the antennas 75 in the cavities 74 may be positioned on the side of the electronic device 10 in the positive or negative x-axis 27 and radiate through the side glass, such that signals from these antennas 75 radiate towards or away from the electronic device 10 (e.g., rather than downwards in the negative z-axis 29). In some embodiments, the antennas 75 in the cavities 74 may replace antennas positioned elsewhere within the electronic device 10, such as antennas 75 that may otherwise be positioned next to a USB connector, a power button, etc. That is, the cavities 74 provide space for placement of the antennas 75 (e.g., components in the cavities 74) and other circuitry of the first antenna array module 60A. In some embodiments, the antennas 75 in the cavities 74 may be positioned along an edge of the electronic device 10, such that the antennas 75 may radiate through the edge. The antennas 75 in the cavities 74 radiating wireless signals may be stronger than wireless signals radiated from antennas 75 elsewhere in the package 40H (e.g., disposed further from the edge than the antennas 75 in the cavities 74) due to the close proximity between the antennas 75 in the cavities 74 and the edge.

Figure 14:
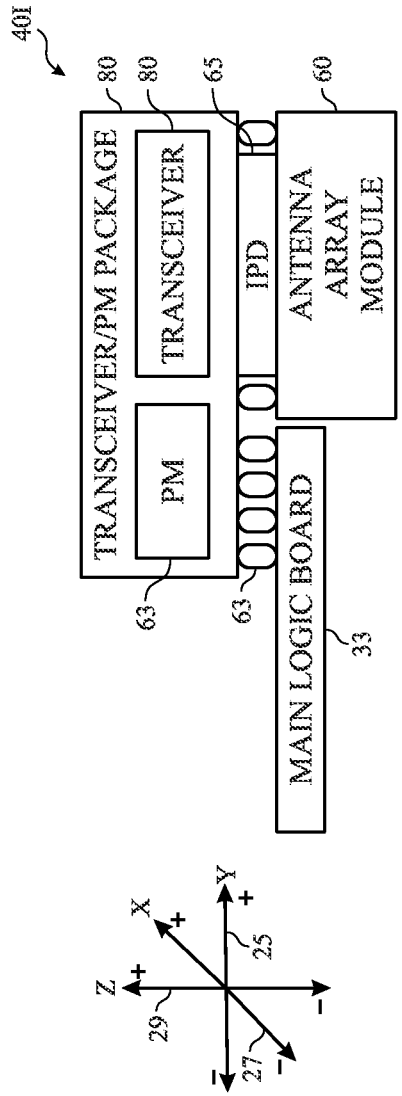
FIG. 14 is a schematic diagram of a package of a back glass panel with a distributed antenna array module directly coupled to a main logic board and a transceiver/power management package, according to embodiments of the present disclosure.

FIG. 14 is a schematic diagram of a package 40I of the back glass panel 34 with the main logic board 33 adjacent to the antenna array module 60, and that are both adjacent to a transceiver and power management package 80. That is, the antenna array module 60 is in the positive x-axis 27 with respect to the main logic board 33 and the transceiver and power management package 80 is in the positive z-axis 29 with respect to the main logic board 33 and the antenna array module 60. The package 40I may also include the integrated passive devices 65 (e.g., radio frequency inductance passive devices). Placing the main logic board 33, the transceiver and power management package 80, and the antenna array module 60 adjacently (as depicted) may provide more efficient routing, lower signal loss, and reduce power consumption due to not using solder balls 63 and/or the proximity of the components when compared to stacking the transceiver and power management package 80 on top of the main logic board 33, further stacked on top of the antenna array module 60.

The transceiver and power management package 80 may be a system-in-package and include the power management circuitry 39 and the transceiver 20 and function as described with respect to FIG. 7 and FIG. 8. Similarly, the integrated passive devices 65 may function as described with respect to FIG. 10. Although the following descriptions describe the package 40I with the antenna array module 60, which represents a particular embodiment, the package 40I may instead include the antenna array 50 with the first band antennas 51, the second band antennas 53, and/or the third band antennas 55 (e.g., without routing and function circuitry). For the reasons previously discussed, the transceiver and power management package 80, with the power management circuitry 39 and the transceiver 20, and the antenna array module 60 may be co-located. Additionally, the main logic board 33 may also be co-located to the transceiver and power management package 80 and the antenna array module 60 to facilitate communicating configuration data for components of the power management circuitry 39, the transceiver 20, and/or the antenna array module 60.

In some embodiments, and as depicted, the solder balls 63 may connect and enable communication between the various packages and components. By way of example, the main logic board 33 may communicate with the antenna array module 60 by passing signals through the transceiver and power management package 80. That is, the transceiver and power management package 80 may function as an intermediary communication path between the main logic board 33 and the antenna array layer 60. Although the depicted embodiment shows the main logic board 33 placed adjacent to the antenna array module 60, which represents a particular embodiment, the package may be configured in a 3D stack that includes the main logic board 33 placed in parallel to the antenna array module 60. For example, the main logic board 33 may be coupled to a bottom side of the transceiver and power management package 80 (e.g., in the negative z-axis 29 with respect to the transceiver and power management package 80) and the antenna array module 60 may be coupled to a top side of the transceiver and power management package 80 (e.g., in the positive z-axis 29 with respect to the transceiver and power management package 80), or vice versa. In some embodiments, the integrated passive devices 65 may directly couple (e.g., without solder balls 63) to the transceiver and power management package 80 and the antenna array module 60.

Figure 15A:
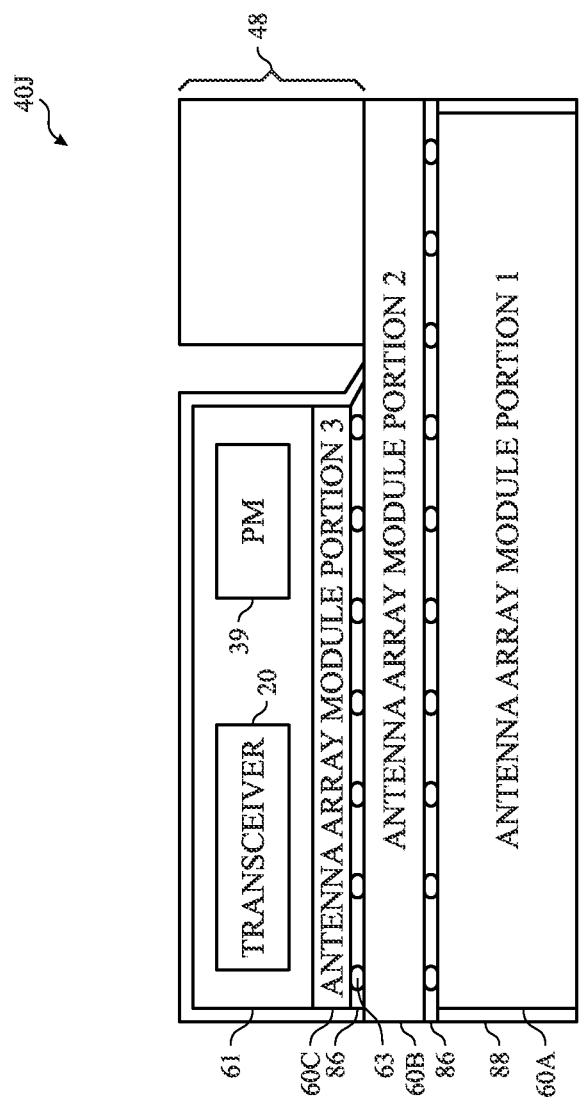
FIG. 15A is a schematic diagram of a package of a left side panel with a distributed antenna array module, underfill, and shielding, according to embodiments of the present disclosure.

FIG. 15A is a schematic diagram of a package 40J of the left side panel 36 having underfill and shielding for the antenna array module 60. As shown, the package 40J may include a power management circuitry 39, a transceiver 20, and a flexible circuit 48. As previously mentioned, the flexible circuit 48 may include the stiffener 56, the flex cable 49, and a connector 57 (not shown). The package 40J may also include the antenna array module 60 that is distributed into three portions, including the first antenna array module portion 60A, the second antenna array module portion 60B, the third antenna array module portion and 60C. Although the following discussions describe three portions of the antenna array module 60, which represents a particular embodiment, the system package 30 described herein may include one or more portions of the antenna array module 60 (e.g., one, greater than one, two, five, sixteen, and so forth). As previously mentioned, distribution of the antenna array module 60 into the one or more portions having a particular number of layers may be based on a functionality, a device type, an application type, and so forth, to be supported by each of the one or more portions. In some embodiments, the placement and/or the dimensions of each of the one or more portions may be based on surrounding components, bandwidth to be supported, carrier to be support, and/or packaging size. The power management circuitry 39, the transceiver 20, the flexible circuit 48, and the antenna array module 60 may operate or provide functionalities as previously described.

The package 40J may include a package underfill 86 that encapsulates and/or surrounds the solder balls 63. Although the following descriptions describe the package underfill 86 with respect to the antenna array module 60, which represents a particular embodiment, the system package 30 described herein may include package underfill 86 in any area of the system package 30 that includes solder balls 63, solder pads, through vias, and/or any other coupling or intermediate components (e.g., surrounds the transceiver and power management package 80 and/or the power management circuitry 39). In some embodiments, the package underfill 86 may also encapsulate silicon components, such as passive or active devices, dies, printed circuit boards, and so on, to provide mechanical support. Generally, the package underfill 86 may protect the solder balls 63 from mechanical stress, such as by providing support or alleviating the stress between the solder balls 63 and substrates supported by the solder balls 63 (e.g., the second antenna array module portion 60B and the third antenna array module portion 60C). The package underfill 86 may include any adhesive materials, such as epoxy (e.g., a silver-filled epoxy or another conductive material that fills the epoxy).

In some embodiments, the package underfill 86 may also provide thermal stress support, such as by dissipating heat from surrounding substrates (e.g., substrates of the second antenna array module portion 60B and the third antenna array module portion 60C) to other areas of the system package 30, such as other panels or areas of the electronic device 10. In this manner, heat may be prevented from concentrating in one particular area of the package 40J of the left side panel 36. The package underfill 86 may also be mixed with other materials, such as ceramic or metallic materials, to provide additional functions, such as the thermal dissipation.

The package underfill 86 may be in liquid form, near liquid form, or initially in liquid form to flow into any gaps (e.g., areas around the solder balls 63 between the first antenna array module portion 60A and the second antenna array module portion 60B and the second antenna array module portion 60B and the third antenna array module portion 60C). After settling into the gaps, the package underfill 86 may undergo a curing process to harden.

The package 40J may also include shielding 88 (e.g., conformal shielding). In particular, the package underfill 86 may prevent shielding 88 from falling into gaps or between the spaces, as those areas are filled with the package underfill 86. As shown, the shielding 88 may be placed around whole portions (e.g., without gaps or spacing between components or substrates) of the package 40J. The shielding 88 may include an outer conductive coating layer that provides package-to-package isolation. In particular, he isolation may provide protection from electromagnetic interference (EMI), providing compliance with Federal Communications Commission (FCC) standards at a component or board level. In some embodiments, the shielding 88 may be placed around portions of the package 40J that emit signals that may cause disruption (e.g., noise) if left unblocked.

Figure 15B:
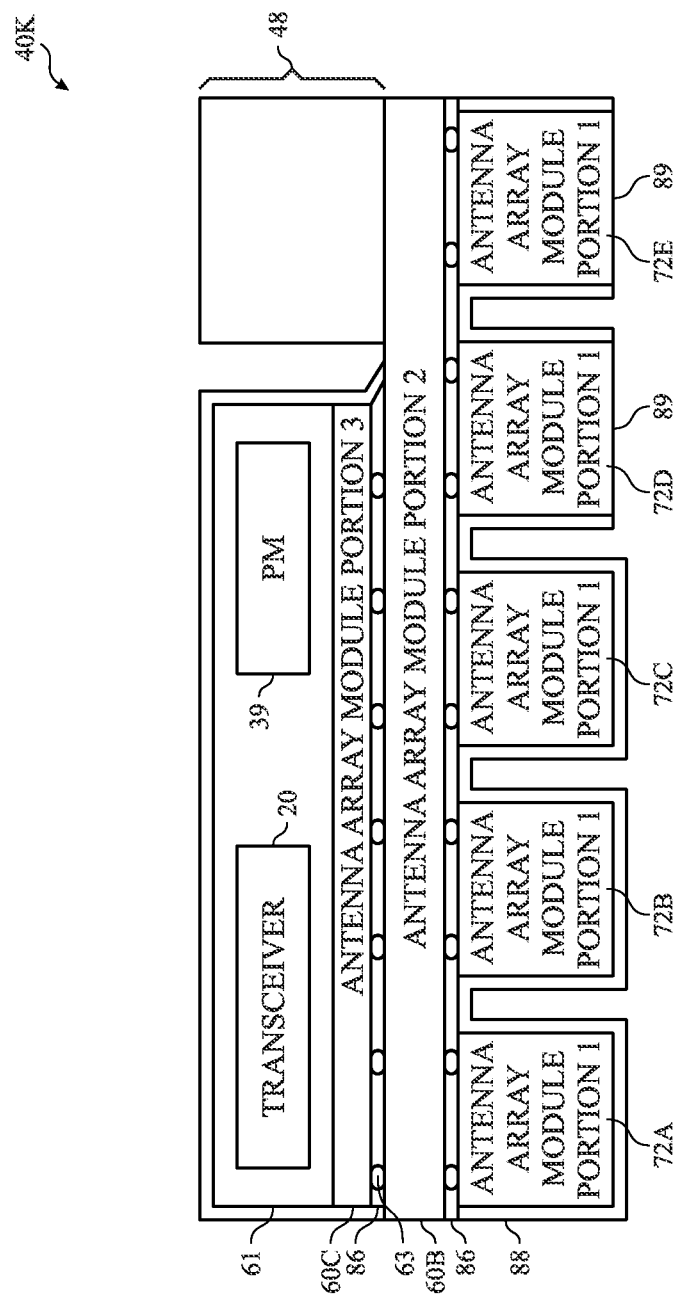
FIG. 15B is a schematic diagram of the package with a distributed antenna array module having shielding on some portions of an antenna array module, according to embodiments of the present disclosure.

To illustrate, FIG. 15B is a schematic diagram of a package 40K of the left side panel 36 with shielding 88 disposed about some portions of the first antenna array module portion 60A. The first antenna array module portion 60A may be distributed into sub-antenna array portions 72, as described with respect to FIG. 12. In the depicted embodiment, a first sub-antenna array portion 72A, a second sub-antenna array portion 72B, and a third sub-antenna array portion 72C may include shielding 88 on each exposed surface (e.g., wall). However, a fourth sub-antenna array portion 72D and a fifth sub-antenna array portion 72E may not include shielding on each exposed surface area. In particular, as depicted, one exposed surface 89 (e.g., wall) of each of the sub-antenna array portions 72D, 72E do not include shielding. The shielding 88 provided may be based on a threshold level of noise emitted from each of the sub-antenna array portions 72. For example, the first through the third sub-antenna array portions 72A-C may emit more noise than the fourth and fifth sub-antenna array portions 72D and 72E, and, as such, may be equipped with more shielding 88.

Figure 16:
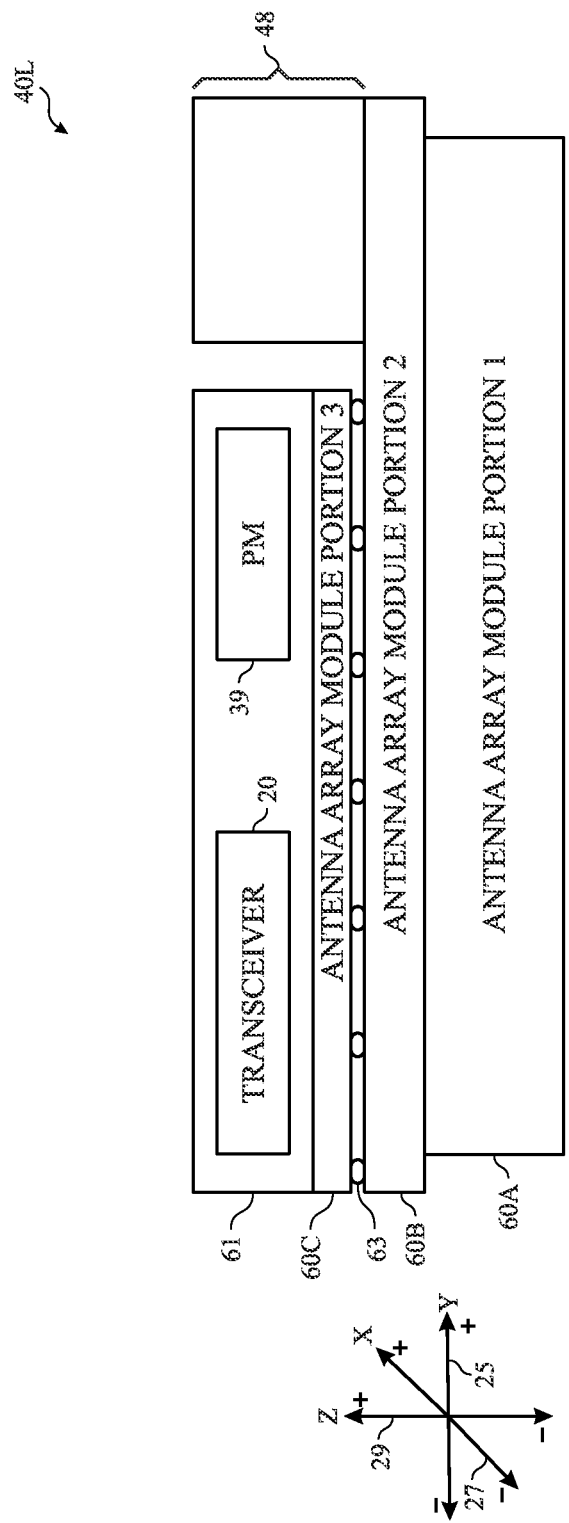
FIG. 16 is a schematic diagram of a package with direct coupling between portions of a distributed antenna array module, according to embodiments of the present disclosure.

In some embodiments, the package 40 may include direct coupling between silicon components, such as between multiple substrates. To illustrate, FIG. 16 is a schematic diagram of a package 40L of the left side panel 36 with the first antenna array module portion 60A directly coupled to the second antenna array portion 60B. That is, the first and the second antenna array module portions 60A and 60B may be directly coupled (e.g., by stacking) using an adhesive material and without using soldering, such as the solder balls 63. Specifically, the second antenna array module portion 60B may be placed on top of the first antenna array module portion 60A (e.g., in the positive z-axis 29) and coupled using the adhesive material, such as conductive epoxy. In particular, the adhesive material may electrically couple signals from the second antenna array module portion 60B to the first antenna array module portion 60A. In the depicted embodiment, the package 40L of the left side panel 36 with the adhesive material that couples substrates of the first and the second antenna array module portions 60A and 60B, may not use package underfill 86 since there is no intermediate connection between the substrates (e.g., no solder balls 63).

Figure 17:
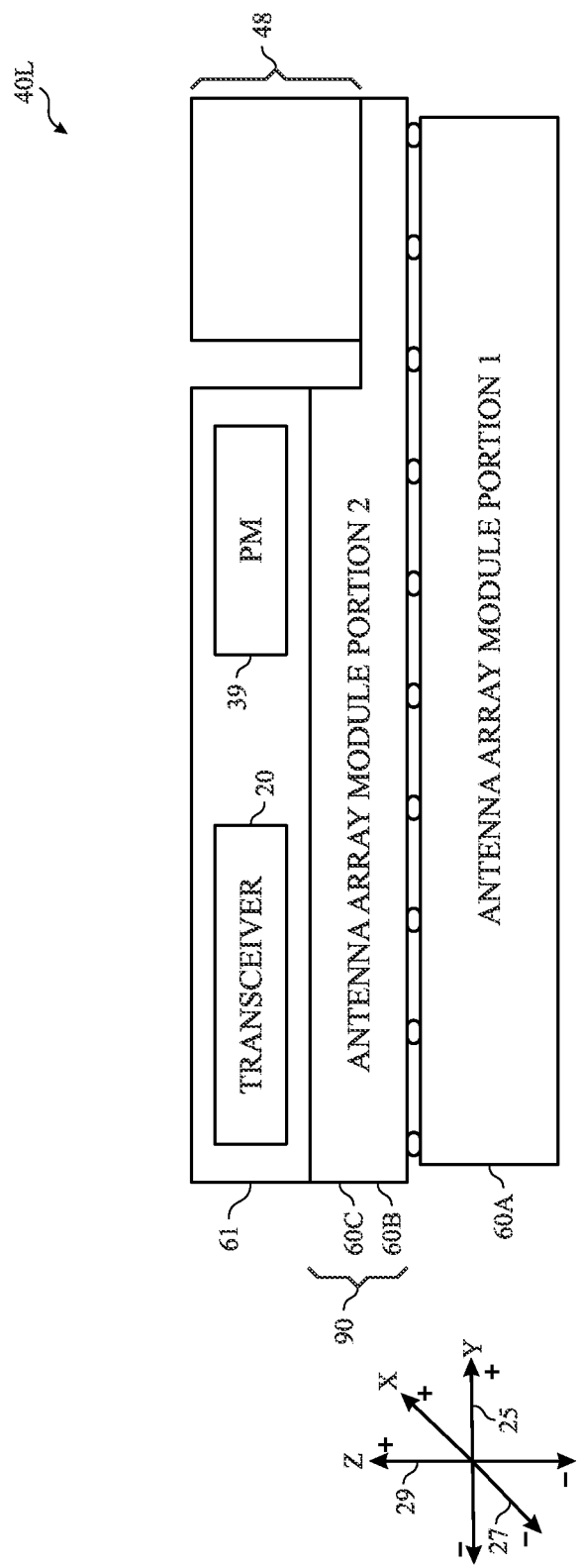
FIG. 17 is schematic diagram of a package with a distributed antenna array module having a recess, according to embodiments of the present disclosure.

FIG. 17 is schematic diagram of a package 40M of the left side panel 36 with a recess 90 (e.g., recessed area) cut out or carved out from a substrate (e.g., antenna substrate) of the antenna array module (e.g., the second antenna array module portion 60B). In particular, the second antenna array module portion 60B may include the recess 90 to accommodate, for example, additional or different components (e.g., taller components as compared to the package 40G of FIG. 12) while maintaining similar dimensions. The amount, shape, and/or dimensions of the recess 90 may be based at least on the components to be placed within the recess 90. Moreover, the package 40M with components in the recess 90 may include the distributed form of the antenna array module 60 including the first and the second antenna array module portions 60A and 60B. By way of example, the components may have a height (e.g., space along the z-axis 29) range between 0.5 mm to 1.2 mm. The dimensions, such as the height, of the recess 90 may be based on the components and have a corresponding height of at least 0.5 mm to 1.2 mm. Breaking apart the antenna array module 60 into multiple portions may continue creating usable space within the package 40M to accommodate adding or expanding components, as well as freeing up space constraints associated with certain components (e.g., placing the power management circuitry 39 and the transceiver 20 in close proximity to the antenna array module 60).

Figure 18:
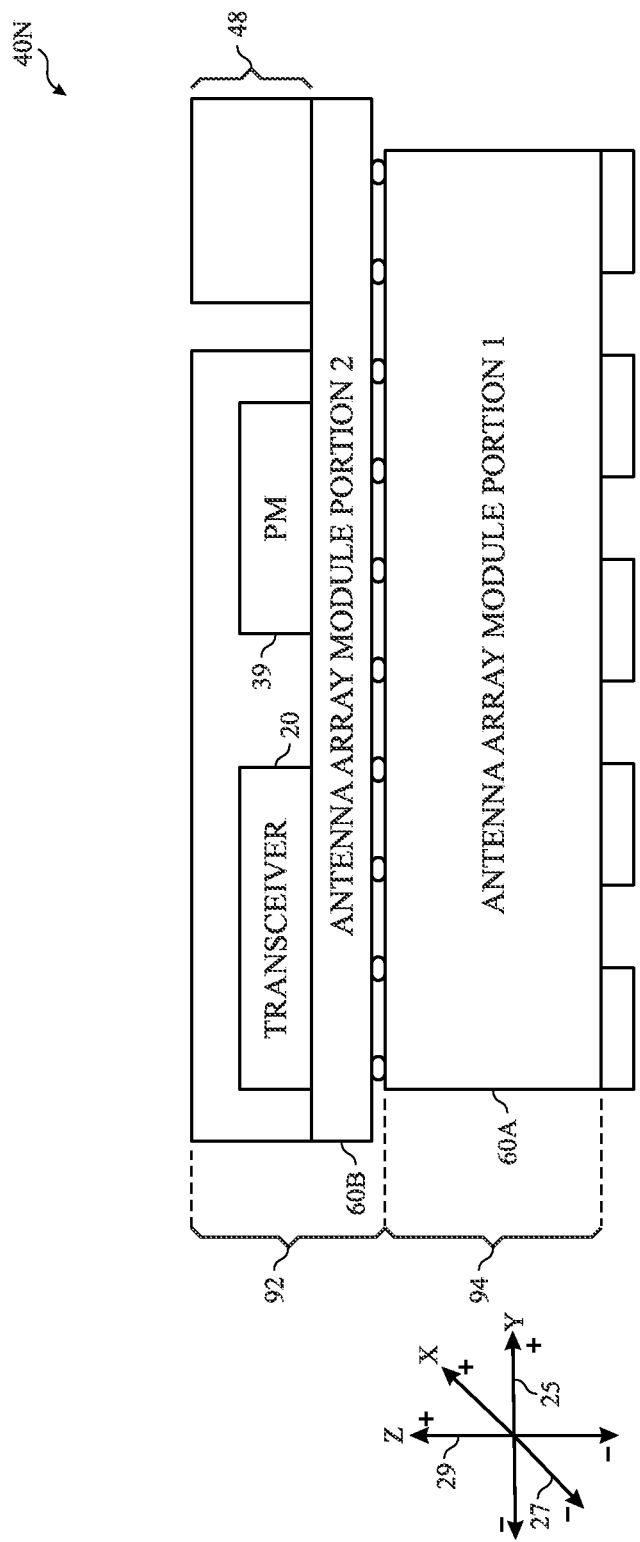
FIG. 18 is schematic diagram of a package having a "T-shaped" structure, according to embodiments of the present disclosure.

In some embodiments, the package 40 of the left side panel 36 may be wider towards the top of the package in the positive z-axis 29 and narrower at the bottom of the package in the negative z-axis 29, or vice versa. To illustrate, FIG. 18 is schematic diagram of a package 40N of the left side panel 36 with relatively wider top portion 92 and a narrower bottom portion 94, creating a "t-shaped" structure. The relatively wider top portion 92 and narrower bottom portion 94, or vice versa, enables placement of various sized components and/or modules in the appropriate portion of the structure. For example, if the first antenna array module portion 60A is wider than second antenna array module portion 60B (e.g., along the x-axis 27), then the first antenna array module portion 60A may be placed in the relatively wider top portion 92 and the second antenna array module portion 60B may be placed in the relatively narrower bottom portion 94 of the structure.

Since the top portion 92 is wider, the top portion 92 may accommodate more and/or larger components than the bottom portion 94. By way of example, the top of the package 40N may have a length of approximately 0.1 mm to 100 mm (e.g., 0.2 mm, 10 mm to 50 mm, such as 10 mm, 20 mm, 25 mm, 30 mm, 40 mm, and so on) in the x-axis 27 direction while the bottom of the package 40N has a length less than the length of the top of the package 40N in the x-axis 27 direction. For example, the top portion 92 of the package 40N may have a length of 0.023 mm to 0.0235 mm in the x-axis 27 direction while the bottom portion 94 of the package 40N may have a length of 0.022 mm in the x-axis 27 direction. As another example, the top portion 92 and the bottom portion 94 of the package 40N may have the same length. That is, the depicted package 40N of FIG. 18 illustrates a T-shape, but in additional or alternative embodiments, the bottom portion 94 may be wider than the top portion 92 (e.g., corresponding to an upside-down T-shape or L-shape), or they be of the same width, as shown in at least FIGS. 8, 9B, 10, 11, 12, 15A, and 15B above.

As such, the techniques described herein facilitate efficient modification of a radio frequency package at various sides of a radio frequency device (e.g., a back glass side, a front glass side, a left side, and/or a right side of the radio frequency device). The space conservation packaging techniques described herein may enable adding and/or replacing components to provide additional or new wireless communication support while conserving space, maintaining a distance between particular components (e.g., spacing), co-location of particular components, or other particular position based specifications, within the radio frequency package for a particular side of the radio frequency device. Some space conservation packaging techniques, such as distributing a substrate (e.g., the antenna array module) into smaller portions for various placement throughout a package may also allow parallel manufacturing of the smaller portions with the smaller number of layers. In this manner, the package may be efficiently produced in a shorter time period than manufacturing the package without the distributed substrate.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A radio frequency package, comprising:
    a first portion of an antenna array module configured to provide a first wireless communication functionality;
    a second portion of the antenna array module configured to provide a second wireless communication functionality; and
    a flexible cable configured to communicate signals between the first portion of the antenna array module and the second portion of the antenna array module, the flexible cable comprising:
        a first end;
        a second end;
        a first surface, wherein the first portion of the antenna array module is directly coupled to the first surface between the first end and the second end; and
        a second surface, wherein the second portion of the antenna array module is directly coupled to the second surface between the first end and the second end.

2. The radio frequency package of claim 1, wherein the first portion of the antenna array module, the second portion of the antenna array module, or both, comprises a plurality of cavities comprising a plurality of antennas.

3. The radio frequency package of claim 2, wherein the plurality of antennas comprises one or more low-band antennas, one or more high-band antennas, or both.

4. The radio frequency package of claim 1, wherein the radio frequency package is disposed on a first printed circuit board, and wherein the flexible cable is configured to communicate data between the radio frequency package and one or more packages disposed on a second printed circuit board via the first end, the second end, or both.

5. The radio frequency package of claim 1, wherein the first portion of the antenna array module, the second portion of the antenna array module, or both, is distributed into a plurality of sub-antenna array portions.

6. The radio frequency package of claim 5, wherein a shielding is disposed on one or more exposed surfaces of one or more of the plurality of sub-antenna array portions.

7. The radio frequency package of claim 6, wherein the shielding is based at least in part on a threshold level of noise emitted from each of the plurality of sub-antenna array portions.

8. The radio frequency package of claim 5, wherein each of the plurality of sub-antenna array portions comprises one or more dielectric materials, mold pieces, antennas, or any combination thereof.

9. The radio frequency package of claim 8, wherein the radio frequency package is disposed on a printed circuit board and the flexible cable is disposed at a non-perpendicular angle with respect to the printed circuit board, and wherein the one or more of the antennas correspondingly radiate wireless signals at the non-perpendicular angle.

10. The radio frequency package of claim 9, wherein the non-perpendicular angle is between 10° and 350°.

11. The radio frequency package of claim 1, comprising:
    a third portion of the antenna array module configured to provide a third wireless communication functionality;
    a plurality of solder balls coupling the third portion of the antenna array module to the first portion, the second portion, or both; and
    a package underfill disposed in gaps between the plurality of solder balls, the first portion, the second portion, the third portion, or any combination thereof.

12. The radio frequency package of claim 1, comprising power management circuitry configured to manage power supplied to the radio frequency package, wherein the power management circuitry is packaged as a system-in-package comprising one or more integrated circuits.

13. The radio frequency package of claim 1, wherein the flexible cable is configured to bend such that one or more sub-antenna array portions of the second portion of the antenna array module are disposed at a non-zero angle relative to the first portion of the antenna array module.

14. A system package, comprising:
a first portion of an antenna array module comprising routing circuitry;
a second portion of the antenna array module comprising a substrate, a first set of one or more antennas disposed on the substrate, one or more cavities formed in the substrate, and a second set of one or more antennas disposed in respective cavities of the one or more cavities, wherein the routing circuitry is configured to provide a communication path between transceiver circuitry and the first set of one or more antennas, the second set of one or more antennas, or both; and
a plurality of solder balls coupling the first portion of the antenna array module and the second portion of the antenna array module.

15. The system package of claim 14, comprising the transceiver circuitry.

16. The system package of claim 14, wherein the first set of one or more antennas or the second set of one or more antennas comprises high-band antennas configured to communicate at a frequency between 20 GHz and 80 GHz, and wherein the first set of one or more antennas comprises a different frequency band than the second set of one or more antennas.

17. The system package of claim 14, wherein the system package is disposed on a first printed circuit board, and wherein the system package comprises a flexible cable that couples the system package to a second system package disposed on a second printed circuit board, and wherein the transceiver circuitry is configured to transmit and receive wireless signals via the first set of one or more antennas, the second set of one or more antennas, or both.

18. A system-in-package, comprising:
a first portion of an antenna array module configured to route transmission signals from a transceiver to a plurality of antennas, reception signals from the plurality of antennas to the transceiver, or both, wherein the first portion comprises a first set of metal layers;
a second portion of the antenna array module comprising the plurality of antennas, wherein the second portion comprises a second set of metal layers, wherein the first set of metal layers comprises fewer layers than the second set of metal layers, and wherein the first portion of the antenna array module directly couples to the second portion of the antenna array module via an adhesive;
the transceiver configured to transmit transmission signals, receive reception signals, or a both, via one or more antennas of the antenna array module, wherein the transceiver communicatively couples to the antenna array module; and
power management circuitry configured to control power functions related to the transmission signals and the reception signals, wherein the power management circuitry communicatively couples to the antenna array module.

19. The system-in-package of claim 18, wherein the system-in-package has a T-shaped structure, the T-shaped structure being wider at a top of the system-in-package and narrower at a bottom of the system-in-package.

20. The system-in-package of claim 18, wherein the system-in-package is disposed on a first printed circuit board, and wherein the system-in-package comprises at least a portion of a flexible cable configured to communicate data between the system-in-package and one or more other system-in-packages disposed on one or more other printed circuit boards.

* * * * *